United States Patent
Kim et al.

(10) Patent No.: US 9,398,324 B2
(45) Date of Patent: Jul. 19, 2016

(54) IMAGE DISPLAY APPARATUS AND OPERATION METHOD THEREOF

(71) Applicant: LG ELECTRONICS INC., Seoul (KR)

(72) Inventors: Changkyoon Kim, Seoul (KR); Eunji Park, Seoul (KR); Yunseok Jeong, Seoul (KR); Hannie Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 14/266,890

(22) Filed: May 1, 2014

(65) Prior Publication Data

US 2015/0143418 A1    May 21, 2015

(30) Foreign Application Priority Data

Nov. 20, 2013   (KR) ........................ 10-2013-0141687

(51) Int. Cl.
| | |
|---|---|
| *H04N 21/422* | (2011.01) |
| *H04N 21/442* | (2011.01) |
| *H04N 21/482* | (2011.01) |
| *H04N 21/488* | (2011.01) |

(52) U.S. Cl.
CPC ... *H04N 21/42204* (2013.01); *H04N 21/44222* (2013.01); *H04N 21/488* (2013.01); *H04N 21/4826* (2013.01)

(58) Field of Classification Search
CPC .......... H04N 21/42204; H04N 21/488; H04N 21/44222; H04N 21/4826
See application file for complete search history.

(56) References Cited

U.S. PATENT DOCUMENTS

| 8,291,452 B1 * | 10/2012 | Yong et al. ...................... 725/41 |
| 2003/0117440 A1 | 6/2003 | Hellyar et al. |
| 2004/0215657 A1 * | 10/2004 | Drucker et al. ............ 707/104.1 |
| 2008/0163059 A1 * | 7/2008 | Craner .......................... 715/719 |
| 2009/0204929 A1 * | 8/2009 | Baurmann et al. ............ 715/836 |
| 2010/0058213 A1 * | 3/2010 | Higuchi et al. ............... 715/766 |
| 2010/0131977 A1 * | 5/2010 | San Jule ............. H04N 21/4722 725/37 |
| 2010/0146555 A1 * | 6/2010 | Komsi ............................ 725/56 |
| 2011/0131610 A1 * | 6/2011 | Lee et al. ........................ 725/48 |
| 2011/0252357 A1 | 10/2011 | Chaudhri |
| 2011/0252446 A1 * | 10/2011 | Jeong et al. ..................... 725/40 |
| 2012/0060116 A1 * | 3/2012 | Baldwin et al. ............... 715/810 |
| 2012/0331505 A1 | 12/2012 | Chun et al. |
| 2013/0086577 A1 * | 4/2013 | Nakashima et al. .......... 717/178 |
| 2013/0332961 A1 * | 12/2013 | Ishigaki .......................... 725/44 |
| 2014/0049692 A1 * | 2/2014 | Sirpal et al. ................... 348/569 |
| 2015/0074603 A1 * | 3/2015 | Abe et al. ...................... 715/823 |

FOREIGN PATENT DOCUMENTS

EP         2 654 292 A1    10/2013

* cited by examiner

*Primary Examiner* — Randy Flynn
(74) *Attorney, Agent, or Firm* — Birch, Stewart, Kolasch & Birch, LLP

(57) ABSTRACT

An operation method of an image display apparatus is discussed, which includes displaying a first dashboard including a live broadcast video and content information based on viewing history of a user on a display unit, displaying a portion of a second dashboard and a third dashboard including the content information based on the viewing history of the user at left and the right sides of the first dashboard or at upper and lower sides of the first dashboard, receiving an input to select the second dashboard or the third dashboard, displaying the entirety of one selected dashboard on an area on which the first dashboard was displayed based on the selection input, displaying a portion of a fourth dashboard on an area on which the selected dashboard was displayed, and displaying a portion of the live broadcast video on an area on which an unselected dashboard was displayed.

14 Claims, 17 Drawing Sheets

IMAGE DISPLAY APPARATUS AND OPERATION METHOD THEREOF

CROSS-REFERENCE TO RELATED APPLICATION

This application claims the priority benefit of Korean Patent Application No. 10-2013-0141687, filed on Nov. 20, 2013 in the Korean Intellectual Property Office, the disclosure of which is incorporated herein by reference.

BACKGROUND OF THE INVENTION

1. Field of the Invention

The present invention relates to an image display apparatus and an operation method thereof and, more particularly, to an image display apparatus that is capable of improving user convenience and an operation method thereof.

2. Description of the Related Art

An image display device has a function to display an image viewable by a user. The user may view a broadcast through the image display device. The image display device displays a broadcast, which is selected by the user from among broadcast signals transmitted from a broadcast station, on a display unit. Currently, broadcasting is transitioning from analog broadcasting to digital broadcasting around the world.

Digital broadcasting refers to broadcasting to transmit digital video and audio signals. The digital broadcasting exhibits low data loss due to robustness against external noise, excellent error correction, high resolution, and high definition, as compared with the analog broadcasting. In addition, the digital broadcasting can provide a bidirectional service unlike the analog broadcasting.

SUMMARY OF THE INVENTION

It is an object of the present invention to provide an image display apparatus that is capable of improving user convenience and an operation method thereof.

It is another object of the present invention to provide an image display apparatus that is capable of providing various user interfaces and an operation method thereof.

In accordance with an aspect of the present invention, the above and other objects can be accomplished by the provision of an operation method of an image display apparatus including displaying a first dashboard including a live broadcast video and content information based on viewing history of a user on a display unit, displaying a portion of a second dashboard and a third dashboard including content information based on the viewing history of the user at left and the right sides of the first dashboard or at upper and lower sides of the first dashboard, receiving an input to select the second dashboard or the third dashboard, displaying the entirety of one selected from between the second dashboard and the third dashboard on an area on which the first dashboard was displayed based on the selection input, displaying a portion of a fourth dashboard on an area on which the selected dashboard was displayed, and displaying a portion of the live broadcast video on an area on which an unselected one of the second and third dashboards was displayed.

In accordance with another aspect of the present invention, there is provided an image display apparatus including a display unit to display a first dashboard including a live broadcast video and content information based on viewing history of a user and to display a portion of a second dashboard and a third dashboard including content information based on the viewing history of the user at left and the right sides of the first dashboard or at upper and lower sides of the first dashboard, a user input unit to receive an input to select the second dashboard or the third dashboard, and a control unit to control the entirety of one selected from between the second dashboard and the third dashboard to be displayed on an area on which the first dashboard was displayed based on the selection input, a portion of a fourth dashboard to be displayed on an area on which the selected dashboard was displayed, and a portion of the live broadcast video to be displayed on an area on which an unselected one of the second and third dashboards was displayed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. However, the present disclosure may be embodied in many different forms and should not be construed as limited to the embodiments set forth herein.

The terms "module" and "unit," when attached to the names of components are used herein to help the understanding of the components and thus they should not be considered as having specific meanings or roles. Accordingly, the terms "module" and "unit" may be used interchangeably.

Figure 1:
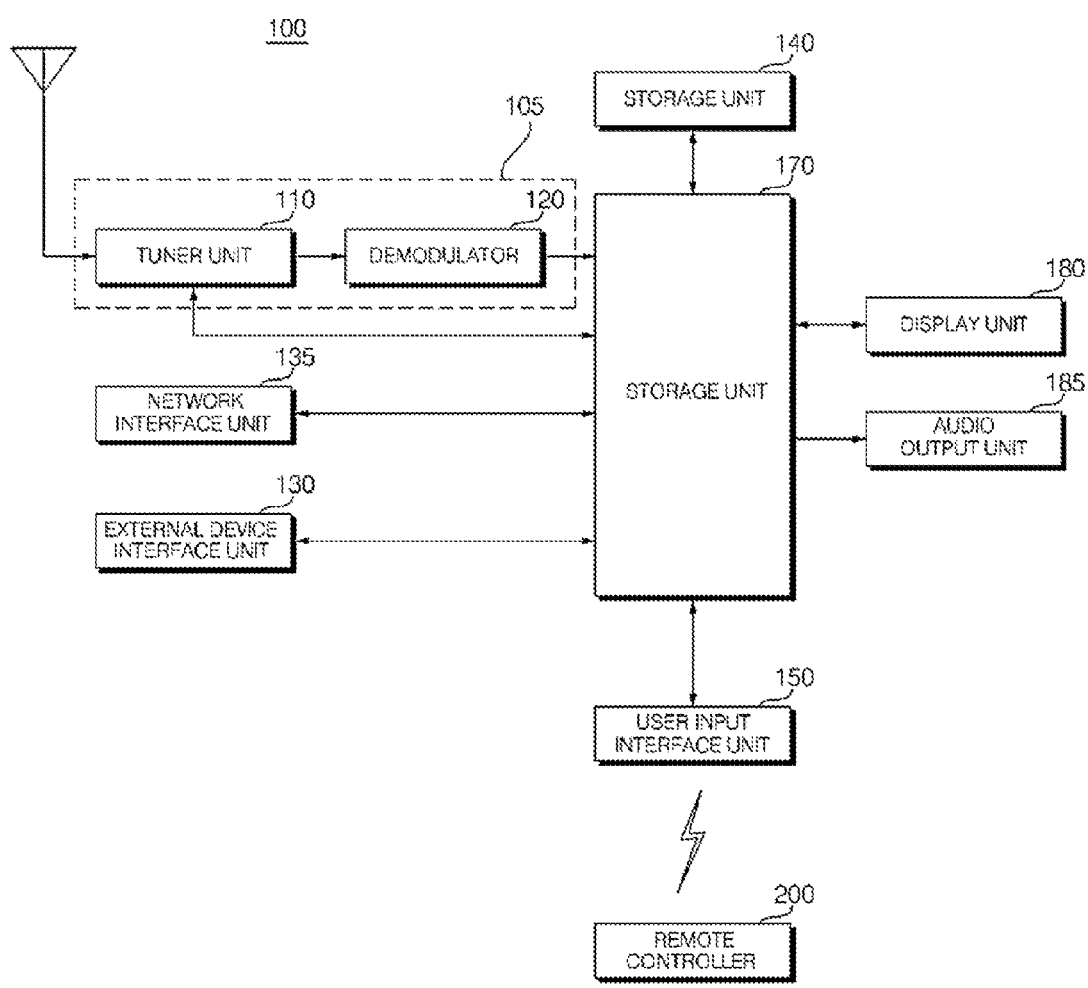
FIG. 1 is an internal block diagram of an image display apparatus according to an embodiment of the present invention.

FIG. 1 is an internal block diagram of an image display apparatus according to an embodiment of the present invention.

Referring to FIG. 1, the image display apparatus 100 according to the embodiment of the present invention may include a broadcast reception unit 105, an external device interface unit 130, a network interface unit 135, a storage unit 140, a user input interface unit 150, a sensor unit (not shown), a control unit 170, a display unit 180, and an audio output unit 185.

The broadcast reception unit 105 may include a tuner unit 110 and a demodulator 120. The broadcast reception unit 105 may further include the network interface unit 135. At need, the broadcast reception unit 105 may be designed to include the tuner unit 110 and the demodulator 120 but not to include the network interface unit 135. On the other hand, the broadcast reception unit 105 may be designed to include the network interface unit 135 but not to include the tuner unit 110 and the demodulator 120.

The tuner unit 110 tunes to a radio frequency (RF) broadcast signal corresponding to a channel selected by a user or all prestored channels from among RF broadcast signals received by an antenna. In addition, the tuner unit 110 converts the tuned RF broadcast signal into an intermediate frequency (IF) signal or a baseband video or audio signal.

For example, in a case in which the tuned RF broadcast signal is a digital broadcast signal, the tuner unit 110 converts the tuned RF broadcast signal into an analog baseband video or audio signal (CVBS/SIF). That is, the tuner unit 110 may process a digital broadcast signal or an analog broadcast signal. The analog baseband video or audio signal (CVBS/SIF) output from the tuner unit 110 may be directly input to the control unit 170.

In addition, the tuner unit 110 may receive a single carrier RF broadcast signal according to an Advanced Television System Committee (ATSC) system or a plural carrier RF broadcast signal according to a Digital Video Broadcasting (DVB) system.

Meanwhile, the tuner unit 110 may sequentially tune to RF broadcast signals of all broadcast channels stored through a channel memory function from among RF broadcast signals received by the antenna and convert the tuned RF broadcast signals into intermediate frequency signals or baseband video or audio signals.

Meanwhile, the tuner unit 110 may include a plurality of tuners to receive broadcast signals of a plurality of channels. Alternatively, the tuner unit 110 may include a single tuner to simultaneously receive broadcast signals of a plurality of channels.

The demodulator 120 receives a digital IF signal (DIF) converted by the tuner unit 110 and performs demodulation.

After performing the demodulation and channel decoding, the demodulator 120 may output a stream signal (TS). In this case, the stream signal may be a multiplexed video signal, a multiplexed audio signal, or a multiplexed data signal.

The stream signal output from the demodulator 120 may be input to the control unit 170. The control unit 170 performs demultiplexing, video/audio signal processing, etc. Subsequently, the control unit 170 outputs a video to the display unit 180 and outputs an audio to the audio output unit 185.

The external device interface unit 130 may transmit or receive data to or from an external device which is connected to the image display apparatus 100. To this end, the external device interface unit 130 may include an audio/video (A/V) input and output unit (not shown) or a wireless communication unit (not shown).

The external device interface unit 130 may be connected to an external device, such as a digital versatile disc (DVD) player, a Blu-ray player, a game console, a camera, a camcorder, a computer (laptop computer), or a set-top box, in a wired/wireless fashion. In addition, the external device interface unit 130 may perform an input operation to or an output operation from the external device.

The A/V input and output unit may receive a video signal and an audio signal from the external device. Meanwhile, the wireless communication unit may perform a near field wireless communication with another electronic device.

The network interface unit 135 may provide an interface to connect the image display apparatus 100 to a wired/wireless network, including the Internet. For example, the network interface unit 135 may receive content or data provided by a content provider or a network operator over a network, such as the Internet.

On the other hand, the network interface unit 135 may perform data communication with an electronic device adjacent to the image display apparatus 100. At this time, the network interface unit 135 may receive apparatus information, remotely controllable channel information, frequency information, or code information of another electronic device.

The storage unit 140 may store a program to process and control signals in the control unit 170. Alternatively, the storage unit 140 may store a signal processed video, audio, or data signal.

In addition, the storage unit 140 may temporarily store a video, audio, or data signal input to the external device interface unit 130. Furthermore, the storage unit 140 may store information regarding a predetermined broadcast channel using a channel memory function, such as a channel map.

Furthermore, the storage unit 140 may store platform shown in FIGS. 6 and 7, which will hereinafter be described.

In addition, the storage unit 140 may store IR format key codes to control other electronic devices using IR signals and store an IR format key database of a plurality of electronic devices.

In FIG. 1, the storage unit 140 is provided separately from the control unit 170. However, the present invention is not limited thereto. For example, the storage unit 140 may be included in the control unit 170.

The user input interface unit 150 transfers a signal input by a user to the control unit 170 or transfers a signal from the control unit 170 to the user.

For example, the user input interface unit 150 may transmit/receive a user input signal, such as power on/off, channel selection, or screen setting, to/from a remote controller 200, may transfer a user input signal input from, a local key (not shown), such as a power key, a channel key, a volume key, or a setting key, to the control unit 170, may transfer a user input signal input from a sensor unit (not shown) to sense a gesture of a user to the control unit 170, or may transmit a signal from the control unit 170 to the sensor unit (not shown).

In this embodiment, the user input interface unit 150 may receive information of an individual from the remote controller 200. In addition to the information of the individual, the user input interface unit 150 may further receive information of a web server accessed through the information of the individual.

The remote controller 200 may transmit the information of the individual to the image display apparatus 100 according to an IR mode or an RF mode. At this time, the user input interface unit 150 transmits the received information of the individual to the control unit 170.

Meanwhile, the information of the individual may include individual identification (ID) information, password information, and individual email information for the image display apparatus 100. In addition, the information of the individual may be individual ID information or password information which may be commonly used in various electronic devices including a portable terminal. Alternatively, the information of the individual may be individual ID information or password information for a server accessed to the image display apparatus 100.

That is, the information of the individual may be information necessary for login to an electronic device or service using a predetermined account.

Meanwhile, the user input interface unit 150 may receive apparatus information, remotely controllable channel information, frequency information, or code information of an electronic device from another electronic device adjacent to the image display apparatus 100 transmitted from the remote controller 200.

The control unit 170 may demultiplex a stream input through the tuner unit 110, the demodulator 120, or the external device interface unit 130 or process demultiplexed signals to generate and output a video or audio output signal.

The video signal processed by the control unit 170 may be input to the display unit 180, which may display a video corresponding to the video signal. In addition, the video signal processed by the control unit 170 may be input to an external output device through the external device interface unit 130.

The audio signal processed by the control unit 170 may be output to the audio output unit 185. In addition, the audio signal processed by the control unit 170 may be input to the external output device through the external device interface unit 130.

Although not shown in FIG. 1, the control unit 170 may include a demultiplexing unit and an image processing unit, which will hereinafter be described with reference to FIG. 2.

On the other hand, the control unit 170 may control overall operation of the image display apparatus 100. For example, the control unit 170 may control the tuner unit 110 tune to a channel selected by a user or an RF broadcast corresponding to a prestored channel.

In addition, the control unit 170 may control the image display apparatus 100 based on a user command input through the user input interface unit 150 or an internal program.

On the other hand, the control unit 170 may control the display unit 180 to display an image. In this case, the image displayed on the display unit 180 may be a still picture or a motion picture. On the other hand, the image displayed on the display unit 180 may be a two-dimensional (2D) image or a three-dimensional (3D) image.

Meanwhile, the control unit 170 may generate and display a predetermined object of the image displayed on the display unit 180 as a 3D object. For example, the object may be at least one selected from among an accessed web page (newspaper, magazine, etc.), an electronic program guide (EPG), a variety of menus, a widget, an icon, a still picture, a motion picture, and text.

Meanwhile, the control unit 170 may recognize location of a user based on an image captured by an image capturing unit (not shown). For example, the control unit 170 may recognize a distance (z-axis coordinate) between the user and the image display apparatus 100. In addition, the control unit 170 may recognize an x-axis coordinate and a y-axis coordinate in the display unit 180 corresponding to the location of the user.

Meanwhile, in this embodiment, the control unit 170 may control login to be performed based on the information of the individual received from the remote controller 200. At this time, the login may be login to the image display apparatus 100 itself, login to a server connected to the image display apparatus 100, or login to a predetermined web server joined based on the information of the individual.

For example, in a case in which login to the image display apparatus 100 itself is performed based on individual ID information or password information, the control unit 170 may control an individual screen set per user account to be displayed on the display unit 180. In a case in which there is an image being watched, the control unit 170 may control the individual set screen to be displayed together with the image being watched. Alternatively, the control unit 170 may control the image being watched to be switched to the individual set screen and the individual set screen to be displayed.

In another example, in a case in which login to the server connected to the image display apparatus 100 is performed, the control unit 170 may control a server access screen received from the server to be displayed on the display unit 180. Specifically, an app server screen may be displayed on the display unit 180. In a case in which there is an image being watched, the control unit 170 may control the server access screen to be displayed together with the image being watched. Alternatively, the control unit 170 may control the image being watched to be switched and displayed as to the server access screen and the server access screen to be displayed.

Meanwhile, in a case in which the image display apparatus 100 is powered off when the information of the individual is received, the control unit 170 may control the power supply unit (not shown) to turn the image display apparatus 100 on. That is, in a case in which the information of the individual is received by the user input interface unit 150 in a standby mode, the control unit 170 may switch the standby mode to a wakeup mode and control the power supply unit to supply power to various modules or units.

Meanwhile, based on apparatus information of an electronic device adjacent to the image display apparatus 100 received from the network interface unit 135 or the user input interface unit 150 or remotely controllable channel information, frequency information, or code information of another electronic device, the control unit 170 may determine whether the respective electronic devices have been accessed according to the information of the individual from the remote controller 200 and control an object indicating that login to another electronic device has been performed to be displayed on the display unit 180.

Alternatively, based on apparatus information of an electronic device adjacent to the image display apparatus 100 or remotely controllable channel information, frequency information, or code information of another electronic device, the channel information, the frequency information, or the code information to the remote controller 200

Although not shown in the drawing, a channel browsing processor to generate a thumbnail image corresponding to a channel signal or an externally input signal may be further provided. The channel browsing processor may receive a stream signal (TS) output from the demodulator 120 or a stream signal output from the external device interface unit 130, extract an image from the received stream signal, and generate a thumbnail image. The generated thumbnail image may be stream-decoded together with the decoded image and then input to the control unit 170. The control unit 170 may control a thumbnail list including a plurality of thumbnail images to be displayed on the display unit 180 using the input thumbnail image.

At this time, the thumbnail list may be displayed in a simple view mode in which a portion of the thumbnail list is displayed in a state in which a predetermined image is displayed on the display unit 180 or in an entire view mode in which the thumbnail list is displayed on the most part of the display unit 180. The thumbnail images within the thumbnail list may be sequentially updated The display unit 180 coverts an image signal, a data signal, an on-screen display (OSD) signal, or a control signal processed by the control unit 170 or an image signal, a data signal, or a control signal received from the external device interface unit 130 to generate a drive signal.

A plasma display panel (PDP), a liquid crystal display (LCD), an organic light emitting device (OLED), or a flexible display may be used as the display unit 180. In addition, the display unit 180 may have a 3D display function.

On the other hand, a touchscreen may be used as the display unit 180. In this case, the display unit 180 may be used as an input device in addition to an output device.

The audio output unit 185 receives an audio signal processed by the control unit 170 and outputs the received audio signal in the form of audible sound.

The image capturing unit (not shown) captures an image of a user. The image capturing unit (not shown) may include a camera. However, the present invention is not limited thereto. For example, the image capturing unit (not shown) may include a plurality of cameras. Meanwhile, the image capturing unit (not shown) may be embedded in the image display apparatus 100 at the upper part of the display unit 180 or separately disposed. Image information captured by the image capturing unit (not shown) may be input to the control unit 170.

The control unit 170 may sense a gesture of the user by using the image captured by the image capturing unit (not shown) and the signal sensed by the sensing unit (not shown), respectively or in combination.

The remote controller 200 transmits a user input to the user input interface unit 150. To this end, the remote controller 200 may use various communication techniques such as Bluetooth communication, radio frequency (RF) communication, infrared (IR) communication, ultra wideband (UWB) communication, ZigBee communication, and near field communication (NFC).

In addition, the remote controller 200 may receive a video, audio, or data signal output from the user input interface unit 150. In addition, the remote controller 200 may display the received signal or output sound.

Meanwhile, in this embodiment, the remote controller 200 may receive information from a predetermined electronic device through a near field communication, etc. As previously described, the information may be individual ID information or password information which may be used in a portable terminal, an image display apparatus, an electronic device, etc.

Meanwhile, the remote controller 200 may transmit the received information of the individual to the image display apparatus 100. At this time, the IR mode or the RF mode may be used as the communication mode.

In this embodiment, the remote controller 200 may be a spatial remote controller that is capable of displaying a pointer corresponding to motion of a user. That is, the remote controller 200 may transmit the information of the individual to the image display apparatus 100 using the RF mode.

Meanwhile, the remote controller 200 may further receive information of the web server accessed based on the information of the individual in addition to the information of the individual.

Meanwhile, the remote controller 200 may receive apparatus information, remotely controllable channel information, frequency information, or code information of an electronic device from another electronic device adjacent to the image display apparatus 100. The remote controller 200 may assign a channel, frequency, or code to the corresponding electronic device based on the information of the another electronic device to remotely control the corresponding electronic device.

Meanwhile, the image display apparatus 100 may be a fixed type or mobile type digital broadcast receiver that can receive digital broadcast.

Meanwhile, the block diagram of the image display apparatus 100 shown in FIG. 1 is a view illustrating the embodiment of the present invention. The respective components of the block diagram may be combined, added, or omitted according to the specifications of an image display apparatus 100 which is actually embodied. That is, two or more components may be combined into a single component or one component may be divided into two or more components as needed. In addition, the function performed by each block is intended for description of the embodiment of the invention, and its detailed action or device does not limit the scope of the invention.

On the other hand, the image display apparatus 100 may not include the tuner unit 110 and the demodulator 120 shown in FIG. 1 and may receive and reproduce image content through the network interface unit 135 or the external device interface unit 130.

Figure 2:
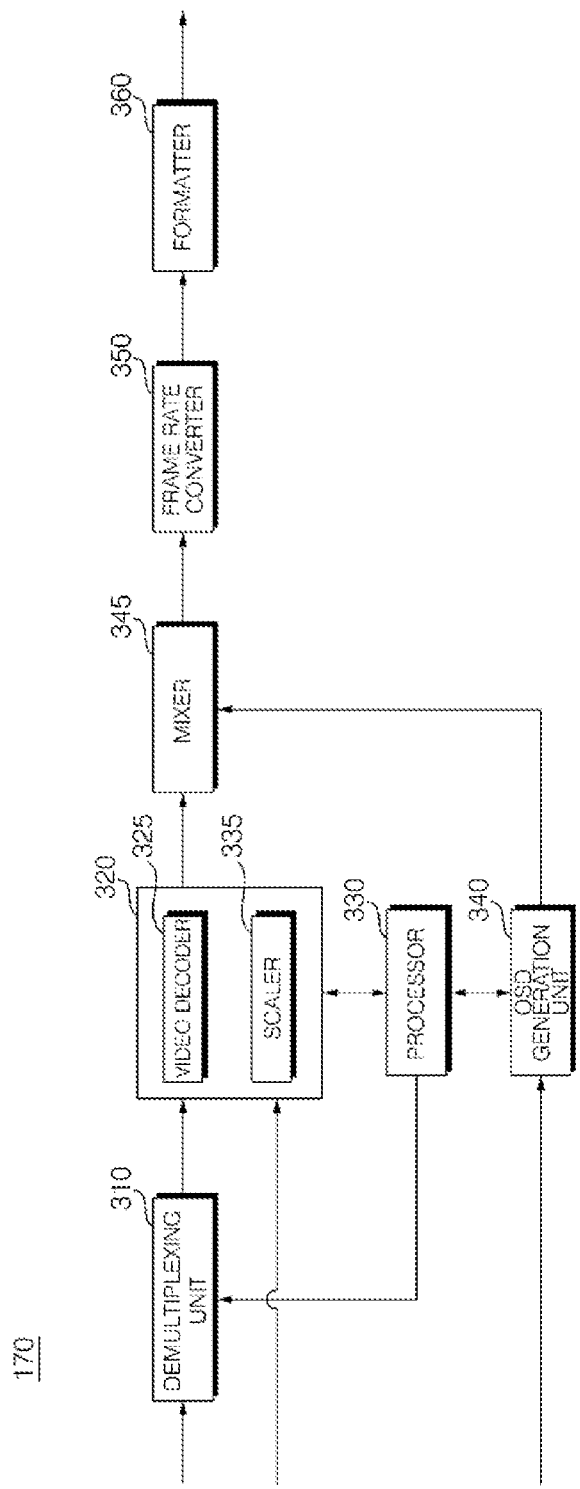
FIG. 2 is an internal block diagram of a control unit of FIG. 1.

FIG. 2 is an internal block diagram of the control unit of FIG. 1.

Referring to FIG. 2, the control unit 170 according to the embodiment of the present invention may include a demultiplexing unit 310, a video processing unit 320, a processor 330, an OSD generation unit 340, a mixer 345, a frame rate converter 350, and a formatter 360. In addition, the control unit 170 may further include an audio processing unit (not shown) and a data processing unit (not shown).

The demultiplexing unit 310 demultiplexes an input stream. For example, in a case in which an MPEG-2 TS is input, the demultiplexing unit 310 may demultiplex the MPEG-2 TS into video, audio, and data signals. The stream signal input to the demultiplexing unit 310 may be a stream signal output from the tuner unit 110, the demodulator 120, or the external device interface unit 130.

The video processing unit 320 may process a demultiplexed video signal. To this end, the video processing unit 320 may include a video decoder 325 and a scaler 335.

The video decoder 325 decodes the demultiplexed video signal and the scaler 335 scales the resolution of the decoded video signal such that the video signal can be output to the display unit 180.

Decoders based on various standards may be used as the video decoder 325.

The processor 330 may control overall operation of the image display apparatus 100 or the control unit 170. For example, the processor 330 may control the tuner unit 110 to tune to a channel selected by a user or an RF broadcast corresponding to a prestored channel.

In addition, the processor 330 may control the image display apparatus 100 based on a user command input through the user input interface unit 150 or an internal program.

Furthermore, the processor 330 may control data transmission to the network interface unit 135 or the external device interface unit 130.

In addition, the processor 330 may control operations of the demultiplexing unit 310, the video processing unit 320, and the OSD generation unit 340 of the control unit 170.

The OSD generation unit 340 generates an OSD signal according to a user input or autonomously. For example, the OSD generation unit 340 may generate a signal to display various kinds of information on the screen of the display unit 180 in the form of graphics or text based on a user input signal. The generated OSD signal may include various data, such as a user interface screen, various menu screens, a widget, and an icon, of the image display apparatus 100. In addition, the generated OSD signal may include a 2D object or a 3D object.

In addition, the OSD generation unit 340 may generate a pointer that can be displayed on the display unit based on a pointing signal input from the remote controller 200. In particular, the pointer may be generated by a pointing signal processing unit. The OSD generation unit 340 may include such a pointing signal processing unit (not shown). Of course, the pointing signal processing unit (not shown) may not be provided in the OSD generation unit 340 but may be separately provided.

Meanwhile, in this embodiment, the OSD generation unit 340 may generate or configure a set individual screen in a case in which login is performed to the image display apparatus 100 itself. Alternatively, in a case in which login is performed to the accessed server, the OSD generation unit 340 may generate or configure at least a portion of a server access screen received from the corresponding server such that the server access screen can be displayed on the display unit 180. Alternatively, the OSD generation unit 340 may generate or configure at least a portion of a web server access screen of the web server accessed through the information of the individual based on information of the corresponding web server.

The mixer 345 may mix the OSD signal generated by the OSD generation unit 340 with the decoded video signal processed by the video processing unit 320. At this time, the OSD signal and the decoded video signal may each include at least one selected from between a 2D signal and a 3D signal. The mixed signal is provided to the frame rate converter 350.

The frame rate converter (FRC) 350 may convert the frame rate of an input video. On the other hand, the frame rate converter 350 may directly output an input video without conversion of the frame rate of the input video.

The formatter 360 receives a signal mixed by the mixer 345, i.e. the OSD signal and the decoded video signal, changes the format of the received signal so that the signal is suitable for the display unit 180, and outputs the signal, the format of which has been changed. For example, the formatter 360 may output R, G, and B data signals. The R, G, and B data signals may be output as low voltage differential signaling (LVDS) or mini-LVDS.

On the other hand, the formatter 360 may separate a 3D video signal from a 2D video signal to display a 3D video. In addition, the formatter 360 may change the format of a 3D video signal or convert a 2D video signal into a 3D video signal.

Meanwhile, the audio processing unit (not shown) of the control unit 170 may process a demultiplexed audio signal. To this end, the audio processing unit (not shown) may include various decoders.

In addition, the audio processing unit (not shown) of the control unit 170 may adjust bass, treble, and volume of the audio signal.

The data processing unit (not shown) of the control unit 170 may process a demultiplexed data signal. For example, in a case in which the demultiplexed data signal is an encoded data signal, the data processing unit may decode the demultiplexed data signal. The encoded data signal may be EPG information containing broadcast information, such as start time and end time, of a broadcast program provided by each channel.

In FIG. 2, the signals from the OSD generation unit 340 and the video processing unit 320 are mixed by the mixer 345 and 3D processing is performed by the formatter 360. However, the present invention is not limited thereto. For example, the mixer may be disposed at the rear of the formatter.

Meanwhile, the block diagram of the control unit 170 shown in FIG. 2 is a view illustrating the embodiment of the present invention. The respective components of the block diagram may be combined, added, or omitted according to the specifications of a control unit 170 which is actually embodied.

Specifically, the frame rate converter 350 and the formatter 360 may not be provided in the control unit 170 but may be separately provided.

Figure 3:
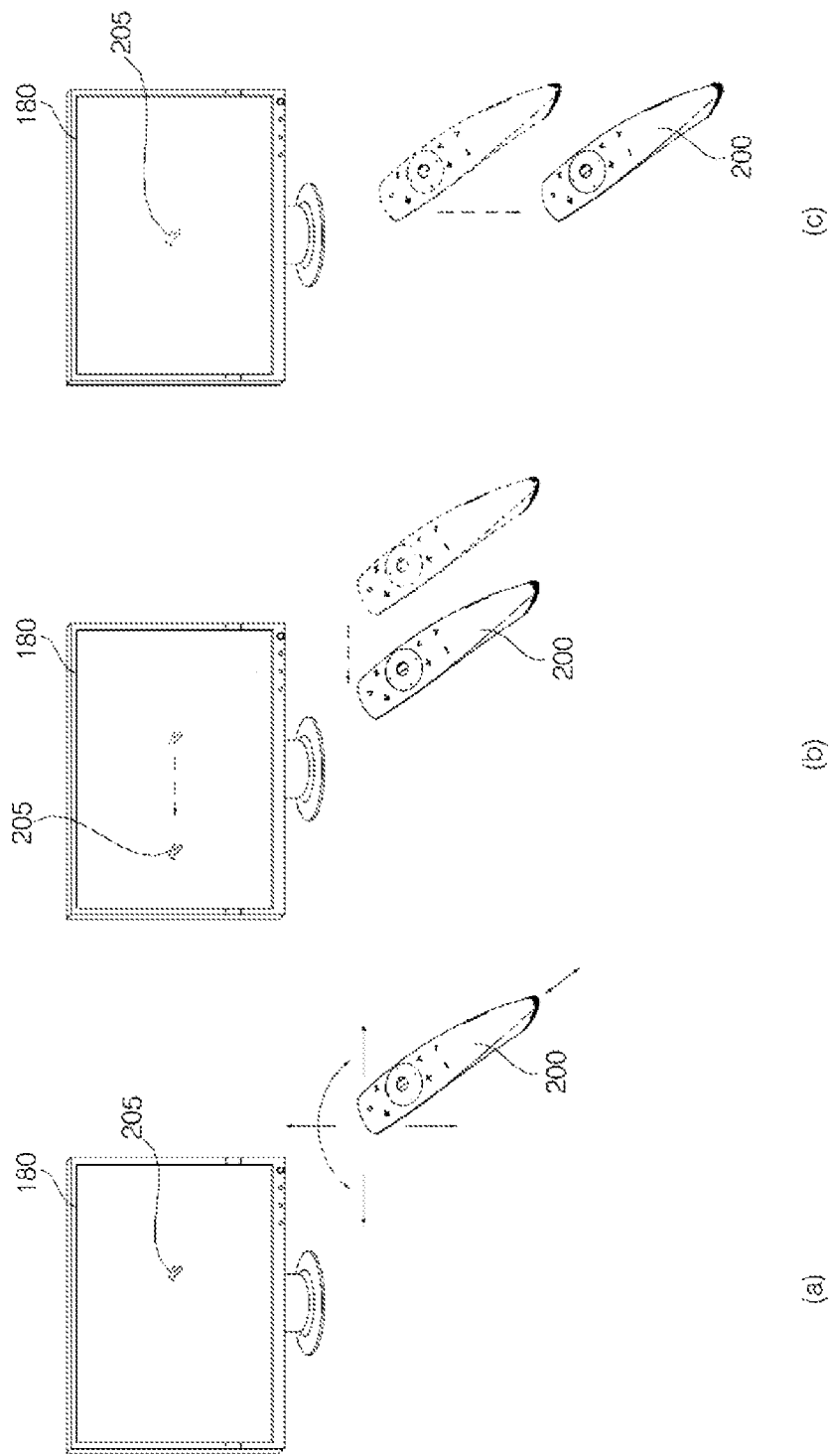
FIG. 3 is a view showing a control method of a remote controller of FIG. 1.

FIG. 3 is a view showing a control method of the remote controller of FIG. 1.

As shown in FIG. 3(a), a pointer 205 corresponding to the remote controller 200 is displayed on the display unit 180.

A user may move or rotate the remote controller 200 up and down, side to side (FIG. 3(b), and back and forth (FIG. 3(c)). The pointer 205 displayed on the display unit 180 corresponds to motion of the remote controller 200. Since the pointer 205 corresponding to the remote controller 200 is moved and displayed according to motion in a 3D space as shown in the drawings, the remote controller 200 may be referred to as a spatial remote controller.

FIG. 3(b) illustrates that, when the user moves the remote controller 200 to the left, the pointer 205 moves to the left on the display unit 180 of the image display apparatus.

Information regarding motion of the remote controller 200 sensed by a sensor of the remote controller is transmitted to the image display apparatus. The image display apparatus may calculate the coordinates of the pointer 205 from the motion information of the remote controller 200. The image display apparatus may display the pointer 205 on the calculated coordinates.

FIG. 3(c) illustrates that the user moves the remote controller 200 away from the display unit 180 while pressing a predetermined button of the remote controller 200. As a result, a selected area corresponding to the pointer 205 may be zoomed in and enlarged on the display unit 180. When the user moves the remote controller 200 toward the display unit 180, on the other hand, a selected area corresponding to the pointer 205 may be zoomed out and contracted on the display unit 180. Alternatively, the selected area may be zoomed out when the remote controller 200 moves away from the display unit 180 and the selected area may be zoomed in when the remote controller 200 moves toward the display unit 180.

Meanwhile, the up, down, left, and right movements of the remote controller 200 may not be recognized in a state in which a predetermined button of the remote controller 200 is pressed. That is, when the remote controller 200 moves away from or toward the display unit 180, the up, down, left and right movements of the remote controller 200 may not be ignored but only the back and forth movement of the remote controller 200 may be recognized. In a state in which a predetermined button of the remote controller 200 is not pressed, only the pointer 205 moves in accordance with the up, down, left or right movement of the remote controller 200

Meanwhile, the movement speed or direction of the pointer 205 may correspond to the movement speed or direction of the remote controller 200.

Figure 4:
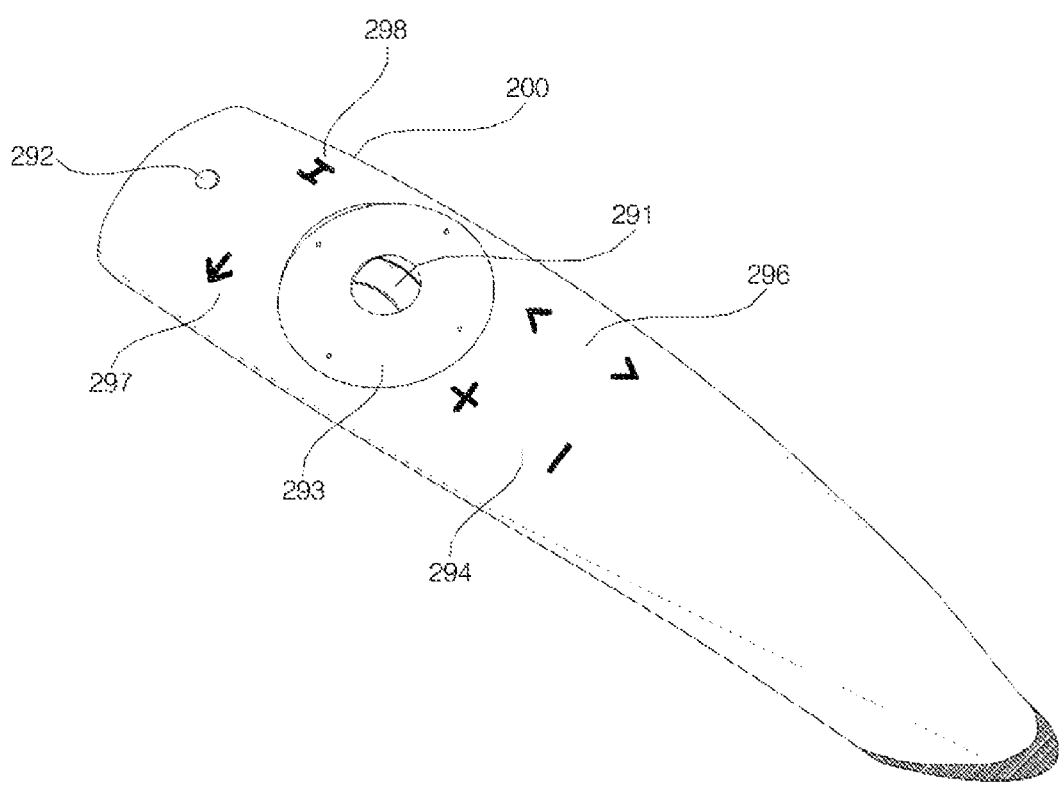
FIG. 4 is a perspective view of a remote controller according to an embodiment of the present invention.
Figure 5:
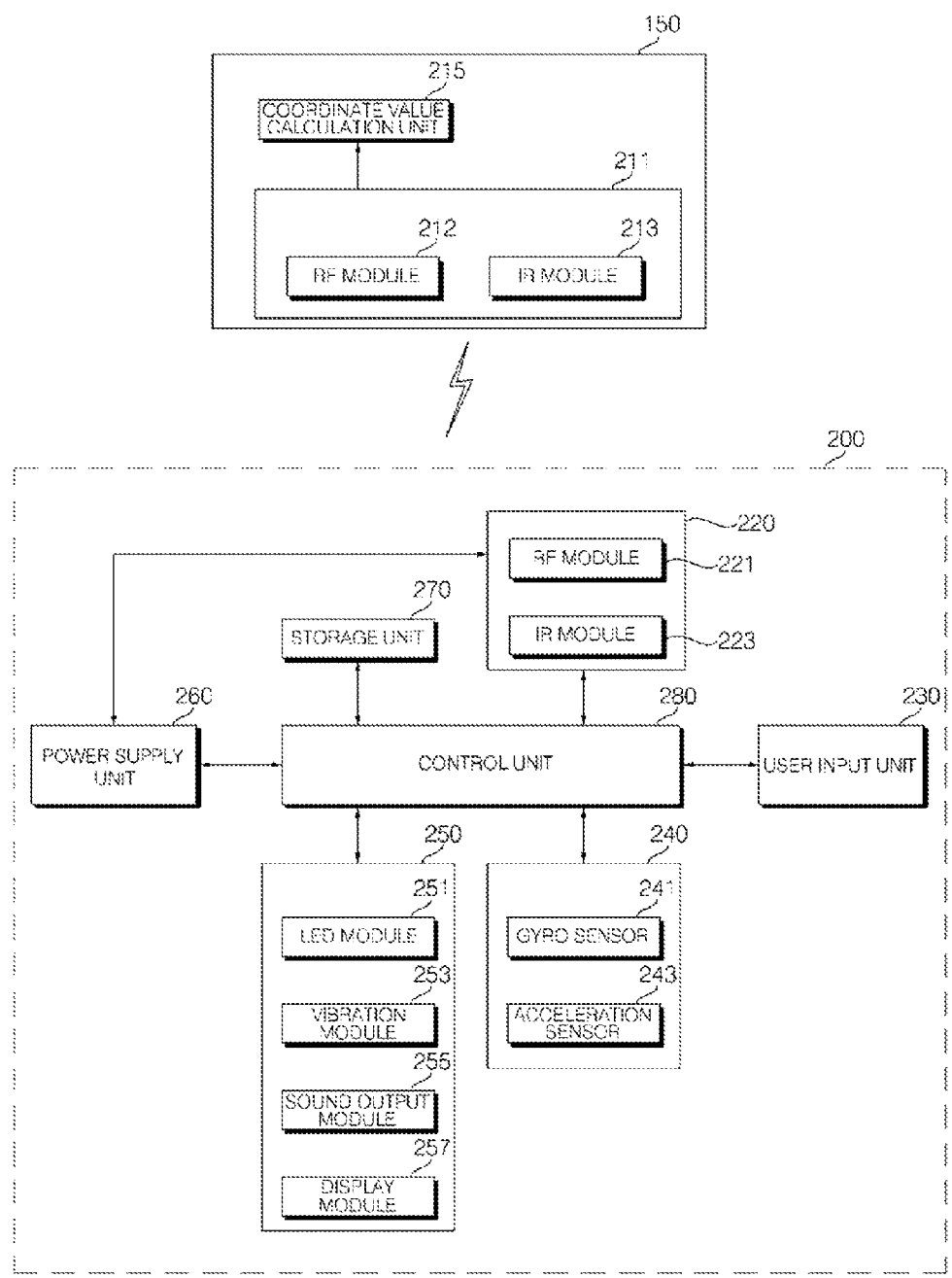
FIG. 5 is an internal block diagram of the remote controller according to the embodiment of the present invention.

FIG. 4 is a perspective view of a remote controller according to an embodiment of the present invention and FIG. 5 is an internal block diagram of the remote controller.

Referring to FIG. 4, a spatial remote controller 201 according to an embodiment of the present invention may include various input keys or input buttons.

For example, the spatial remote controller 201 may include an OK key 291, a menu key 292, four direction keys 293, channel control keys 294, and volume control keys 296.

For example, the OK key 291 may be used for menu or item selection, the menu key 292 may be used to display a menu, the four direction keys may be used to move an indicator up, down, left, and right, the channel control keys 294 may be used for channel up and down, and the volume control keys 296 may be used for volume up and down.

In addition, the spatial remote controller 201 may further include a back key 297 and a home key 298. For example, the back key 297 may be used for movement to a previous screen and the home key 298 may be used for movement to a home screen.

As shown in the drawing, the OK key 291 may have a scroll function. To this end, the OK key 291 may be a wheel key. That is, when the OK key 291 is pressed, a corresponding menu or item may be selected. When the OK key 291 is scrolled up and down, on the other hand, a display screen may be scrolled or a list page may be switched.

Specifically, when, in a state in which an image having a larger size than the display unit 180 is displayed on the display unit 180, the OK key 291 is scrolled to search for the image, an area of the image which is not currently displayed on the display unit 180 is displayed on the display unit 18. In another example, when a list page is displayed on the display unit 180, the OK key 291 may be scrolled to display the previous page or the next page of the current page.

Such a scroll function may be performed by a key other than the OK key 291.

Meanwhile, the four direction keys 293 may be configured in a circular form having up, down, left, and right keys. On the other hand, the four direction keys 293 may be touched. For example, when a touch from the up key to the down key of the four direction keys 293 is performed, a function set according to the corresponding touch input may be input or performed.

Referring to FIG. 5, the remote controller 200 may include a wireless communication unit 220, a user input unit 230, a sensor unit 240, an output unit 250, a power supply unit 260, a storage unit 270, and a control unit 280.

The wireless communication unit 220 transmits and receives signals to and from any one of the image display apparatuses according to the embodiments of the present invention as described above.

Among the image display apparatuses according to the embodiments of the present invention, the image display apparatus 100 will be described by way of example.

In this embodiment, the remote controller 200 may include an RF module 221 to transmit and receive signals to and from the image display apparatus 100 according to an RF communication standard. In addition, the remote controller 200 may further include an IR module 223 to transmit and receive signals to and from the image display apparatus 100 according to an IR communication standard.

Furthermore, the remote controller 200 may further include an NFC module (not shown) for near field communication with an electronic device.

The remote controller 200 may transmit a signal containing information regarding motion of the remote controller 200 to the image display apparatus 100 through the RF module 221.

In addition, the remote controller 200 may receive a signal from the image display apparatus 100 through the RF module 221. As needed, the remote controller 200 may transmit a command, such as a power on/off command, a channel switch command, or a volume change command, to the image display apparatus 100 through the IR module 223.

Meanwhile, in this embodiment, the remote controller 200 may receive information of an individual from a predetermined electronic device through near field communication.

Meanwhile, the remote controller 200 may transmit the received information of the individual to the image display apparatus 100. At this time, the IR mode or the RF mode may be used as the communication mode.

Meanwhile, the remote controller 200 may further receive information of a web server accessed through the information of the individual in addition to the information of the individual.

Meanwhile, the remote controller 200 may receive apparatus information, remotely controllable channel information, frequency information, or code information of another electronic device. The remote controller 200 may assign a channel, frequency, or code to the corresponding electronic device based on the information of the another electronic device to remotely control the corresponding electronic device.

The user input unit 230 may include a keypad, a plurality of keys (buttons), a touchpad, or a touchscreen. The user may input a command associated with the image display apparatus 100 to the remote controller 200 by manipulating the user input unit 230. In a case in which the user input unit 235 includes a plurality of hard key buttons, the user may input a command associated with the image display apparatus 100 to the remote controller 200 by pushing the hard key buttons. On the other hand, in a case in which the user input unit 230 includes a touchscreen, the user may input a command associated with the image display apparatus 100 to the remote controller 200 by touching soft keys of the touchscreen. In addition, the user input unit 230 may include various input tools, such as a scroll key and a jog wheel, which do not limit the scope of the present invention.

The sensor unit 240 may include a gyro sensor 241 or an acceleration sensor 243. The gyro sensor 241 may sense motion of the remote controller 200.

For example, the gyro sensor 241 may sense the motion of the remote controller 200 in x, y, and z-axis directions. The acceleration sensor 243 may sense the movement speed of the remote controller 200. The sensor unit 240 may further include a distance sensor to sense the distance between the remote controller 200 and the display unit 180. In addition, the sensor unit 240 may further include a geomagnetic sensor to sense an azimuth like a compass by sensing flow of a magnetic field generated from the earth. The geomagnetic sensor may sense a variation of the azimuth.

The output unit 250 may output a video or audio signal corresponding to manipulation of the user input unit 230 or corresponding to a signal received from the image display apparatus 100. The user may recognize whether the user input unit 235 has been manipulated or whether the image display apparatus 100 has been controlled, through the output unit 250.

For example, the output unit 250 may include a light emitting diode (LED) module 251 configured to be turned on when the user input unit 230 is manipulated or when a signal is received from or transmitted to the image display apparatus 100 through the wireless communication module 225, a vibration module 253 to generate vibration, a sound output module 255 to output sound, or a display module 257 to output an image.

The power supply unit 260 supplies power to the remote controller 200. In a case in which the remote controller 200 remains stationary for a predetermined time, the power supply unit 260 may interrupt the supply of power to the remote controller 200 to reduce power consumption. The power supply unit 260 may resume the supply of power to the remote controller 200 when a predetermined key of the remote controller 200 is manipulated.

The storage unit 270 may store various types of programs and application data necessary to control or drive the remote controller 200. The remote controller 200 may wirelessly transmit and receive signals to and from the image display apparatus 100 over a predetermined frequency band through the RF module 221. The control unit 280 of the remote controller 200 may store and refer to information regarding a frequency band used for the remote controller 200 to wirelessly transmit and receive signals to and from the paired image display apparatus 100 in the memory 270.

In addition, the storage unit 270 may store IR format key codes to control other electronic devices using IR signals and store an IR format key database of a plurality of electronic devices.

The control unit 280 controls overall operation of the remote controller 200. The controller 280 may transmit a signal corresponding to manipulation of a predetermined key of the user input unit 230 or a signal corresponding to motion of the remote controller 200 sensed by the sensor unit 240 to the image display apparatus 100 through the wireless communication unit 220.

The control unit 280 may control the information of the individual received from the electronic device through near field communication to be transmitted to the image display apparatus 100 through the wireless communication unit 220. Particularly, in a case in which a predetermined key of the user input unit 230 is input, the control unit 280 may control the received information of the individual to be transmitted to the image display apparatus 100 through the wireless communication unit 220.

In addition, the control unit 280 may control the received information of the individual to be transmitted to electronic devices other than the image display apparatus 100. At this time, different channels, frequencies, or codes may be used in response to the respective electronic devices. The channels, frequencies, or codes may be based on apparatus information, remotely controllable channel information, frequency information, or code information of another electronic device.

The user input interface unit 150 of the image display apparatus 100 may include a wireless communication unit 211 to wirelessly transmit and receive signals to and from the remote controller 200 and a coordinate value calculation unit 215 to calculate a coordinate value of a pointer corresponding to motion of the remote controller 200.

The user input interface unit 150 may wirelessly transmit and receive signals to and from the remote controller 200 through an RF module 212. In addition, the user input interface unit 150 may receive a signal transmitted from the remote controller 200 according to an IR communication standard through an IR module 213.

The coordinate value calculation unit 215 may correct a hand tremor or an error from a signal corresponding to motion of the remote controller 200 received through the wireless communication unit 211 to calculate a coordinate value (x, y) of a pointer to be displayed on the display unit 180.

A signal transmitted from the remote controller 200, which is input to the image display apparatus 100 through the user input interface unit 150, is transmitted to the control unit 180 of the image display apparatus 100. The control unit 180 may differentiate information regarding motion and key manipulation of the remote controller 200 from the signal transmitted from the remote controller 200 and may control the image display apparatus 100 in response thereto.

In another example, the remote controller 200 may calculate a coordinate value of the pointer corresponding to motion thereof and output the calculated coordinate value to the user input interface unit 150 of the image display apparatus 100. In this case, the user input interface unit 150 of the image display apparatus 100 may transmit information regarding the received coordinate value of the pointer to the control unit 280 without correcting a hand tremor or an error.

In a further example, the coordinate value calculation unit 215 may be provided in the control unit 170, not in the user input interface unit 150, unlike the drawing.

Figure 6:
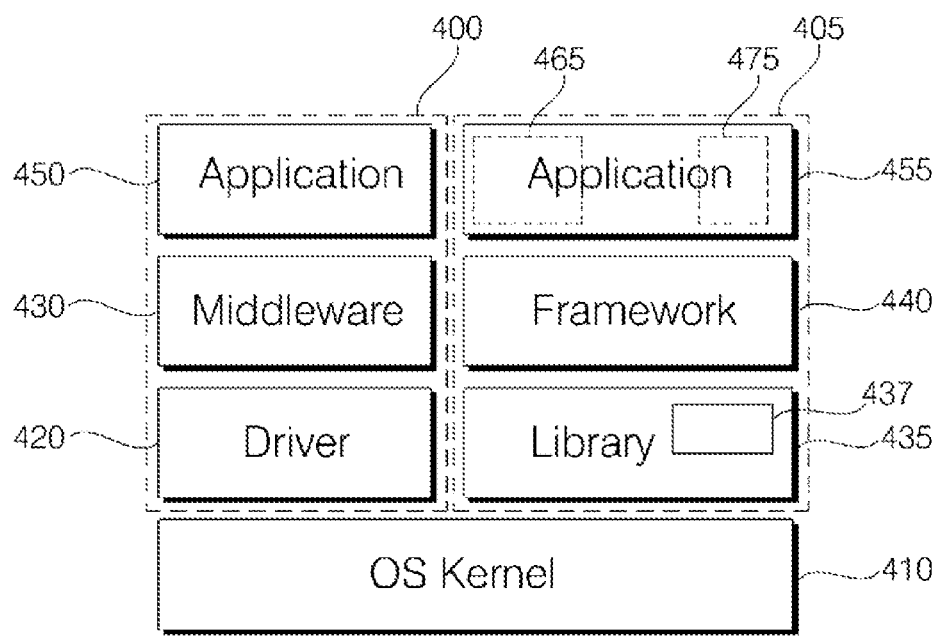
FIG. 6 is a view showing an example of a platform architecture of an image display apparatus according to any one embodiment of the present invention.

FIG. 6 is a view showing an example of a platform architecture of an image display apparatus according to any one embodiment of the present invention.

Figure 7:
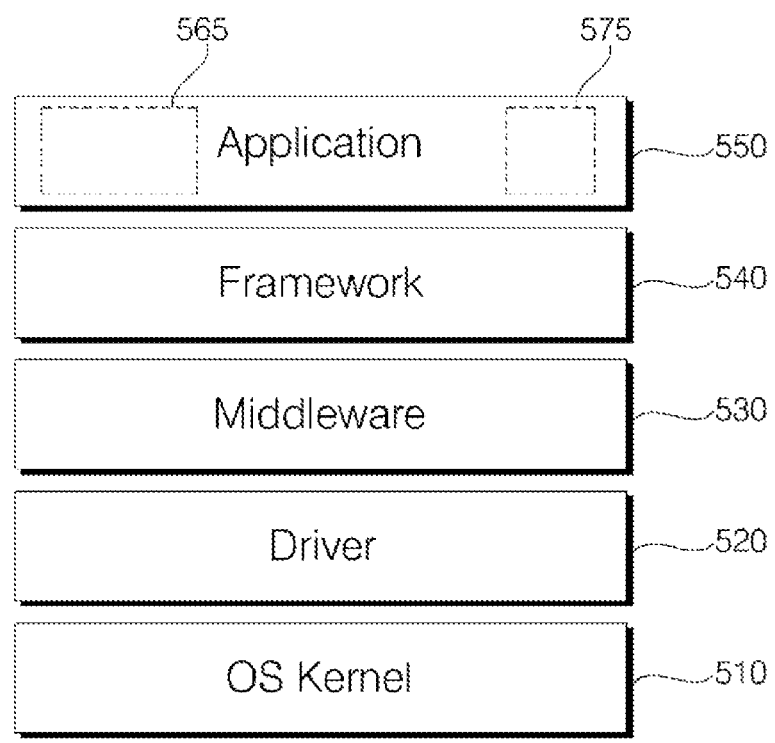
FIG. 7 is a view showing another example of a platform architecture of an image display apparatus according to any one embodiment of the present invention.

FIG. 7 is a view showing another example of a platform architecture of an image display apparatus according to any one embodiment of the present invention.

A platform for any one of the image display apparatuses according to the embodiments of the present invention may have OS-based software to perform the above-described various operations.

Referring first to FIG. 6, a platform for any one of the image display apparatuses according to the embodiments of the present invention is of a separate type. The platform may be designed separately as a legacy system platform 400 and a smart system platform 405. An operating system (OS) kernel 410 may be shared between the legacy system platform 400 and the smart system platform 405

The legacy system platform 400 may include a stack of a driver 420, middleware 430, and an application layer 450 on the OS kernel 410. On the other hand, the smart system platform 405 may include a stack of a library 435, a framework 440, and an application layer 455 on the OS kernel 410.

The OS kernel 410 is the core of an operating system. When the image display apparatus is driven, the OS kernel 410 may be responsible for at least one selected from among driving of hardware drivers, security protection for hardware and processors in the image display apparatus, efficient management of system resources, memory management, hardware interfacing by hardware abstraction, multi-processing, or scheduling associated with multi-processing. Meanwhile, the OS kernel 410 may further perform power management.

The hardware drivers of the OS kernel 410 may include at least one selected from among a display driver, a Wi-Fi driver, a Bluetooth driver, a USE driver, an audio driver, a power manager, a binder driver, and a memory driver.

In addition, the hardware drivers of the OS kernel 410 may be drivers for hardware devices within the OS kernel 410. The hardware drivers may include a character device driver, a block device driver, and a network device driver. The block device driver may need a buffer to buffer data on a specific block basis because data is transmitted on the specific block basis. On the other hand, the character device driver may not require a buffer since data is transmitted on a basic data unit basis, i.e. on a character basis.

The OS kernel 410 may be implemented based on various OSs, such as Unix (Linux) and Windows. In addition, the OS kernel 410 may be a general-purpose open open-source kernel which can be implemented in other electronic devices.

The driver 420 is interposed between the OS kernel 410 and the middleware 430. Along with the middleware 430, the driver 420 drives devices to operate the application layer 450. For example, the driver 420 may include a driver, such as a microcomputer, a display module, a graphics processing unit (GPU), an FRC, a general-purpose input/output (GPIO) pin, a high-definition multimedia interface (HDMI), a system decoder (SDEC) or DEMUX, a video decoder (VDEC), an audio decoder (ADEC), a personal video recorder (PVR), or an inter-integrated circuit (I2C) in the image display apparatus 100. These drivers operate in conjunction with the hardware drivers of the OS kernel 410.

In addition, the driver 420 may further include a driver for the remote controller 200, especially a driver of the spatial remote controller as previously described. Meanwhile, the spatial remote controller driver may be variously provided in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction with tasks based on a different system.

Examples of the middleware 430 in the legacy system platform 400 may include multimedia and hypermedia information coding experts group (MHEG) and advanced common application platform (ACAP) as data broadcasting-related middleware, program and system information protocol (PSIP) and/or SI middleware as broadcasting information-related middleware, and digital living network alliance (DLNA) middleware as peripheral device communication-related middleware.

The application layer 450 on the middleware 430, i.e. the application layer 450 in the legacy system platform 400, may include, for example, user interface (UI) applications associated with various menus in the image display apparatus 100. The application layer 450 on the middleware 430 may be edited and updated over a network by user selection. Through the use of the application layer 450, the user may enter a desired menu of the various user interfaces by manipulating the remote controller while viewing a broadcast video.

In addition, the application layer 450 in the legacy system platform 400 may further include at least one selected from among a TV guide application, a Bluetooth application, a reservation application, a digital video recorder (DVR) application, and a hotkey application.

In the smart system platform 405, the library 435 may be positioned between the OS kernel 410 and the framework 440, forming the basis of the framework 440. For example, the library 435 may include a secure socket layer (SSL) as a security-related library, a webkit as a web engine-related library, c library (libc), and a media framework as a media-related library, such as a video format and an audio format. The library 435 may be written in C or C++. In addition, the library 435 may be exposed to a developer through the framework 440.

The library 435 may include a runtime 437 with a core Java library and a virtual machine (VM). The runtime 437 and the library 435 form the basis of the framework 440.

The virtual machine (VM) may be a virtual machine that enables execution of a plurality of instances, i.e. multi-tasking. For each application of the application layer 455, a virtual machine (VM) may be allocated and executed. For scheduling or interconnection between the plurality of instances, the binder driver (not shown) of the OS kernel 410 may operate.

Meanwhile, the binder driver and the runtime 437 may connect Java-based applications to C-based libraries.

Meanwhile, the library 435 and the runtime 437 may correspond to the middleware of the legacy system platform.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include a resource manager, an activity manager related to activities of applications, a notification manager, and a content provider (CP) to abstract common information between applications. This framework 440 may be written in Java.

The application layer 455 on the framework 440 includes a variety of programs that can be executed and displayed in the image display apparatus 100. The application layer 455 may include a core application including at least one selected from among an e-mail, a short message service (SMS), a calendar, a map, and a browser. The application layer 455 may be written in Java.

In the application layer 455, applications may be categorized into user-undeletable applications 465 stored in the image display apparatus 100 and user-deletable applications 475 that are downloaded from an external device or through a network and stored in the image display apparatus.

Using the applications of the application layer 455, a variety of functions, such as an Internet telephony service, a video on demand (VOD) service, a web album service, a social networking service (SNS), a location-based service (LBS), a map service, a web browsing service, and an application search service, may be performed through network access. In addition, other functions, such as gaming and schedule management, may be performed by the applications.

Referring now to FIG. 7, a platform for any one of the image display apparatuses according to the embodiments of the present invention is of an integrated type. The integrated-type platform may include an OS kernel 510, a driver 520, middleware 530, a framework 540, and an application layer 550.

The platform shown in FIG. 7 is different from the platform shown in FIG. 6 in that the library 435 shown in FIG. 6 is omitted and the application layer 550 is provided as an integrated layer. The driver 520 and the framework 540 correspond to the driver 420 and the framework 440 of FIG. 6, respectively.

Meanwhile, the library 435 of FIG. 6 may be incorporated into the middleware 530 of FIG. 7. That is, the middleware 530 may include both the legacy system middleware and the image display apparatus system middleware. The legacy system middleware may include MHEG or ACAP as data broadcasting-related middleware, PSIP or SI middleware as broadcasting information-related middleware, and DLNA middleware as peripheral device communication-related middleware. The image display apparatus system middleware may include a secure socket layer (SSL) as a security-related library, a webkit as a web engine-related library, libc, and a media framework as a media-related library. The middleware 530 may further include the above-described runtime.

The application layer 550 may include a menu-related application, a TV guide application, a reservation application as legacy system applications and an e-mail, an SMS, a calendar, a map, and a browser as image display apparatus system applications.

In the application layer 550, applications may be categorized into user-undeletable applications 565 that are stored in the image display apparatus 100 and user-installable or user-deletable applications 575 that are downloaded from an external device or through a network and stored in the image display apparatus.

The platforms shown in FIGS. 6 and 7 may be general-purpose ones that can be implemented in many other electronic devices as well as in the image display apparatus.

Meanwhile, the platforms of FIGS. 6 and 7 may be stored or loaded in the memory 140 or the control unit 170 shown in FIG. 1 or an additional processor (not shown). In addition, an additional application processor (not shown) to execute applications may be further provided.

Figure 8:
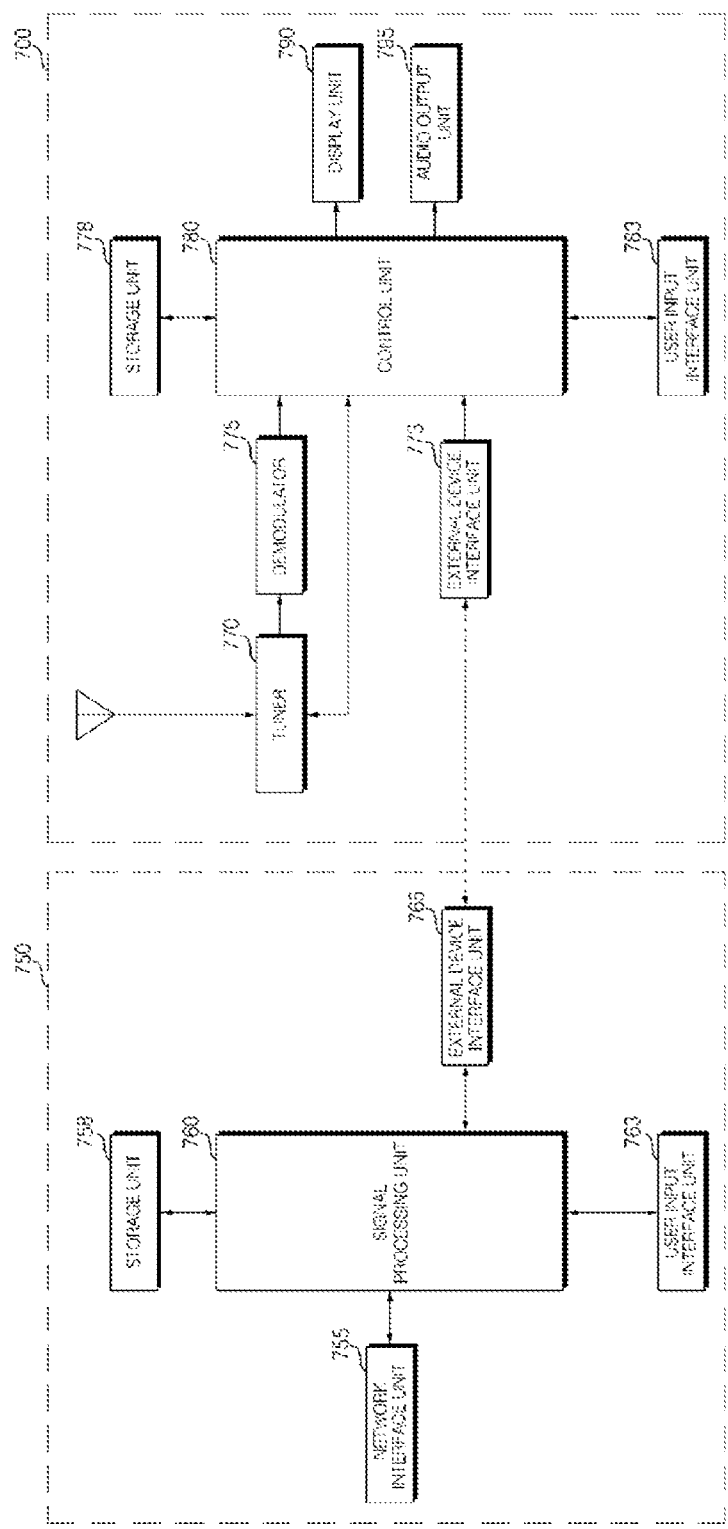
FIGS. 8 and 9 are views separately showing a set-top box and a display device constituting an image display apparatus according to any one embodiment of the present invention.
Figure 9:
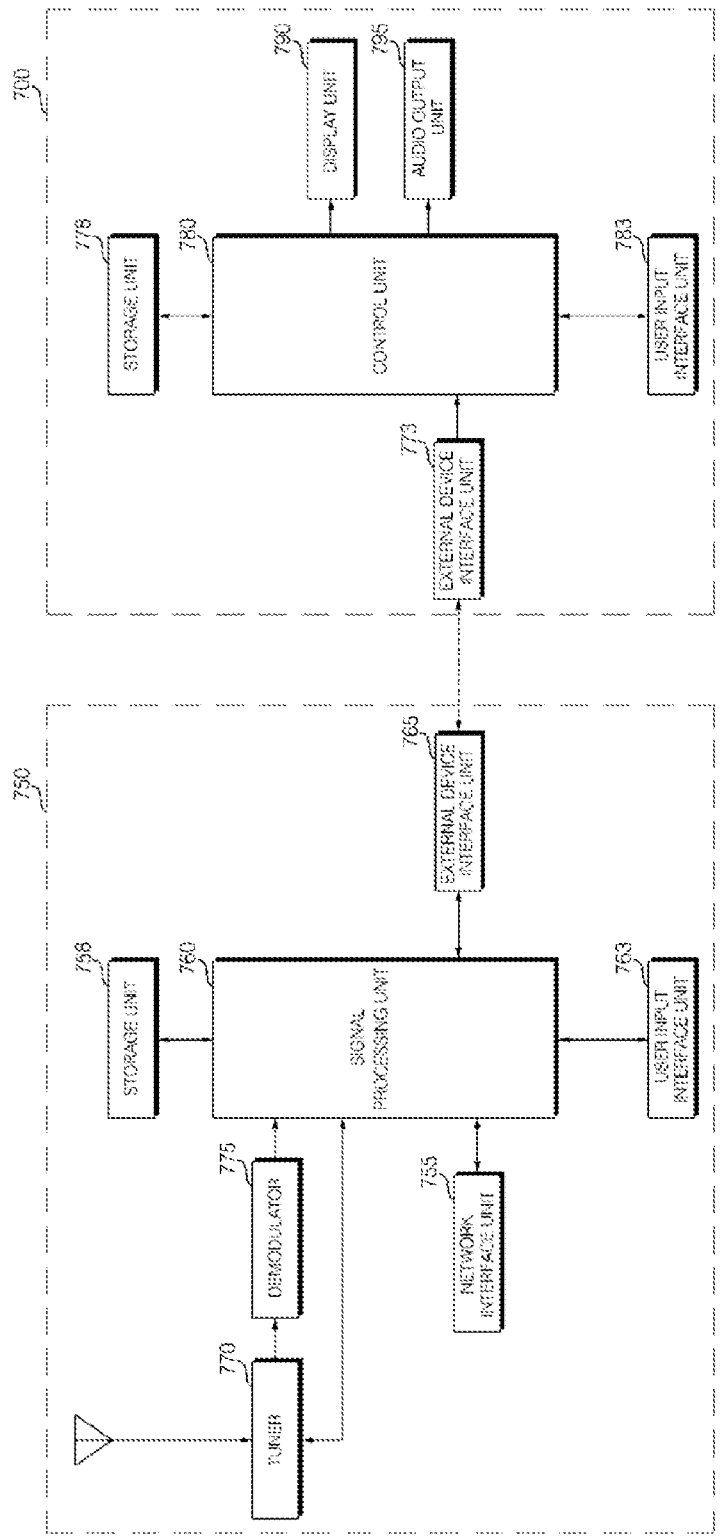

FIGS. 8 and 9 are views separately showing a set-top box and a display device constituting an image display apparatus according to any one embodiment of the present invention.

Referring first to FIG. 8, the set-top box 750 and the display device 700 may transmit or receive data to or from each other in a wired or wireless fashion.

The set-top box 750 may include a network interface unit 755, a storage unit 758, a signal processing unit 760, a user input interface unit 763, and an external device interface unit 765.

The network interface unit 755 serves as an interface between the set-top box 750 and a wired/wireless network such as the Internet. The network interface 755 may transmit data to or receive data from another user or another electronic device over an accessed network or another network linked to the accessed network.

The storage unit 758 may store programs necessary for the signal processing unit 760 to process and control signals and temporarily store a video, audio, or data signal received from the external device interface unit 765 or the network interface unit 755. In addition, the storage unit 758 may store the platforms shown in FIGS. 6 and 7 as previously described.

The signal processing unit 760 processes an input signal. For example, the signal processing unit 760 may demultiplex or decode an input video. In addition, the signal processing unit 760 may demultiplex or decode an audio signal. To this end, the signal processing unit 760 may include a video decoder or an audio decoder. The processed video or audio signal may be transmitted to the display device 700 through the external device interface unit 765.

The user input interface unit 763 transmits a signal received from the user to the signal processing unit 760 or a signal received from the signal processing unit 760 to the user. For example, the user input interface 263 may receive various control signals, such as a power on/off signal, an operation input signal, and a setting input signal, through the local key (not shown) or the remote controller 200 and output the received control signals to the signal processing unit 760.

The external device interface unit 765 serves as an interface for data transmission or reception between the set-top box 750 and an external device that is connected in a wired or wireless fashion. In particular, the external device interface unit 765 serves as an interface for data transmission or reception between the set-top box 750 and the display device 700. In addition, the external device interface unit 765 may also interface with an external device, such as a game console, a camera, a camcorder, or a computer (e.g. a laptop computer), for data transmission or reception.

Meanwhile, the set-top box 750 may further include a media input unit (not shown) for media reproduction. The media input unit may be a Blu-ray input unit (not shown), for example. That is, the set-top box 750 may include a Blu-ray player. After signal processing, such as demultiplexing or decoding, in the signal processing unit 760, a media signal from a Blu-ray disc may be transmitted to the display device 700 through the external device interface unit 765 so as to be displayed on the display device 700.

The display device 700 may include a tuner 770, an external device interface unit 773, a demodulator 775, a storage unit 778, a control unit 780, a user input interface unit 783, a display unit 790, and an audio output unit 795.

The tuner 770, the demodulator 775, the storage unit 778, the control unit 780, the user input interface unit 783, the display unit 790, and the audio output unit 795 correspond to the tuner unit 110, the demodulator 120, the storage unit 140, the control unit 170, the user input interface unit 150, the display unit 180, and the audio output unit 185 shown in FIG. 1, respectively, and thus a description thereof will be omitted.

Meanwhile, the external device interface unit 773 serves as an interface for data transmission or reception between the display device 700 and an external device that is connected in a wired or wireless fashion. In particular, the external device interface unit 773 serves as an interface for data transmission or reception between the display device 700 and the set-top box 750.

Consequently, a video signal or an audio signal received through the set-top box 750 is output through the display unit 790 or the audio output unit 795 via the control unit 170.

Referring now to FIG. 9, the configuration of the set-top box 750 and the display device 700 shown in FIG. 9 is identical to that of the set-top box 750 and the display device 700 shown in FIG. 8 except that the tuner 770 and the demodulator 775 are provided in the set-top box 750, not in the display device 700.

Thus the following description will focus upon such a difference. The signal processing unit 760 may process a broadcast signal received through the tuner 770 and the demodulator 775. The user input interface unit 763 may allow a channel selection input, a channel store input, etc.

Figure 10:
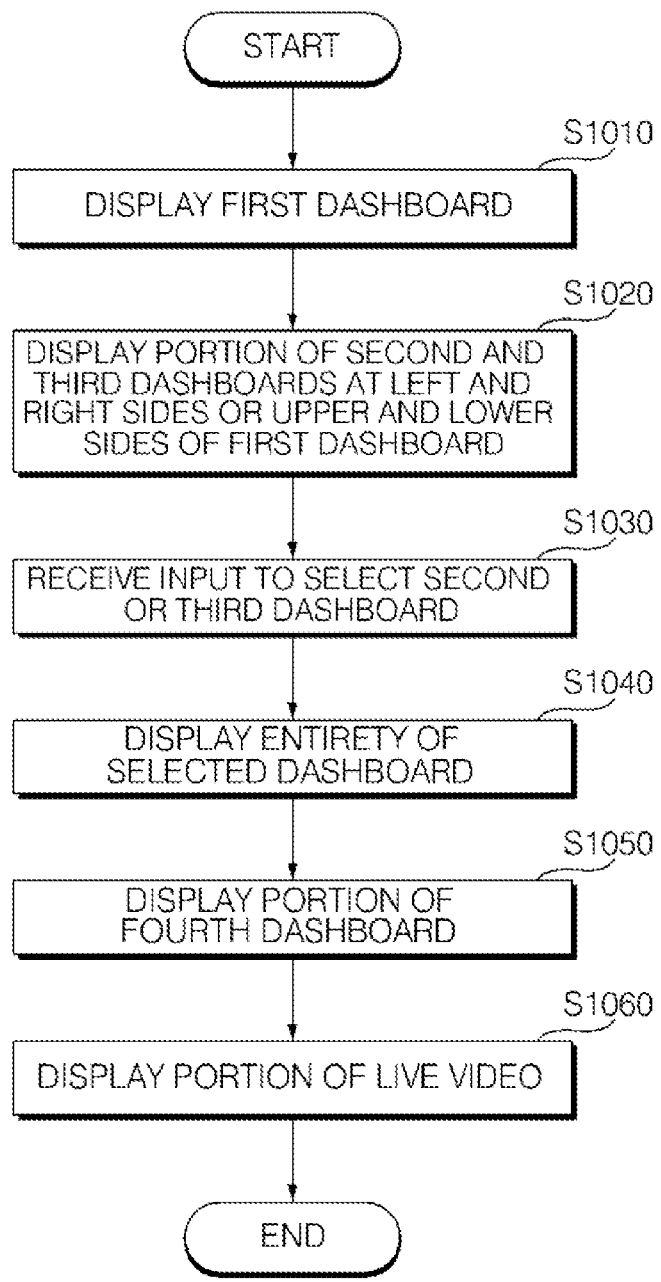
FIG. 10 is a flowchart showing an operation method of an image display apparatus according to an embodiment of the present invention.

FIG. 10 is a flowchart showing an operation method of an image display apparatus according to an embodiment of the present invention and FIGS. 11 to 21 are reference views illustrating various examples of the operation method of the image display apparatus according to the embodiment of the present invention.

Referring to the drawings, in the operation method of the image display apparatus according to the embodiment of the present invention, a first dashboard including a live broadcast video and content information based on the viewing history of a user is displayed on the display unit 180 (S1010).

The image display apparatus 100 according to the present invention may collect viewing history data of a user. Specifically, the control unit 170 may control viewing history data of a user to be collected and stored in the storage unit 140. When a user uses predetermined content, the control unit 170 may count the number of times of using the content and collect start time, end time, and reproduction time. In addition, the control unit 170 may collect details of user manipulation, such as channel change, volume change, favorite channel registration, channel deletion, schedule recording, and schedule viewing setting.

The control unit 170 may control content-related information, such as a broadcast, a VOD, details of predetermined content per input source, e.g. an external input terminal, channel information, and program information, and user manipulation information, such as channel change and volume change, to be collected and stored in the storage unit 140.

Meanwhile, the control unit 170 may control the viewing history to be analyzed and displayed on the display unit 180.

The control unit 170 may analyze the viewing history to calculate a favorite score for the content and classify and manage a favorite score per channel/program/genre category. The favorite score for the content may be added and accumulated per viewing time of the user and the user manipulation.

In addition, the control unit 170 may generate recommended content information based on the viewing history or receive recommended content information from the server based on the viewing history.

Furthermore, the image display apparatus 100 may transmit the viewing history data to a predetermined server and receive data, such as various analysis data, commands, content, and content information, from the server.

Meanwhile, the dashboard may include at least one of objects indicating content information, such as a predetermined broadcast channel, broadcast program information, schedule information, a media list in the image display apparatus or an apparatus connected to the image display apparatus, an application, a motion picture, and a live video. In addition, the dashboard may include an object indicating predetermined devices, such as an external apparatus that is connected to the image display apparatus or an external apparatus that can be connected to the image display apparatus.

Figure 11:
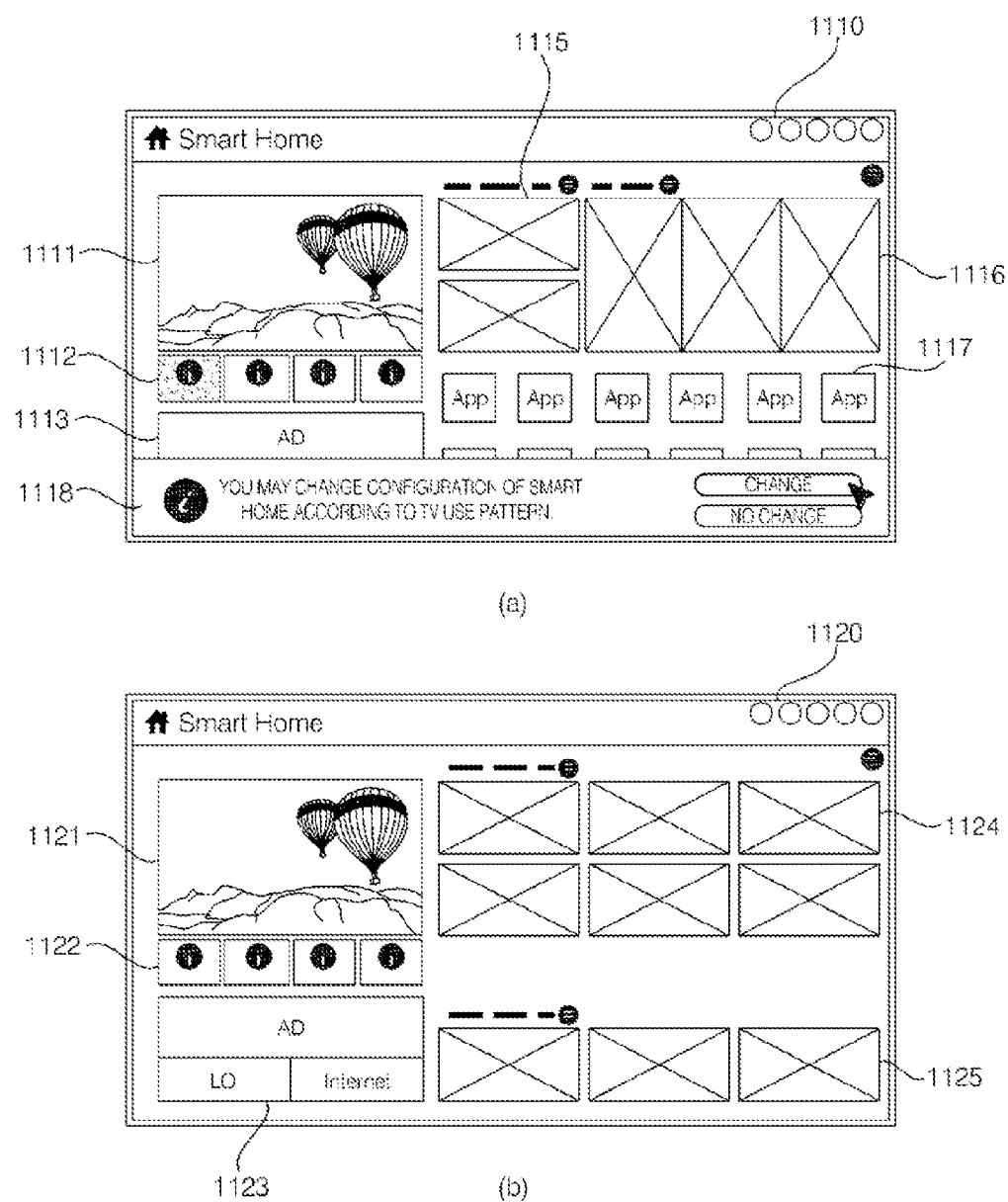
FIGS. 11 to 21 are reference views illustrating various examples of the operation method of the image display apparatus according to the embodiment of the present invention.
Figure 13:
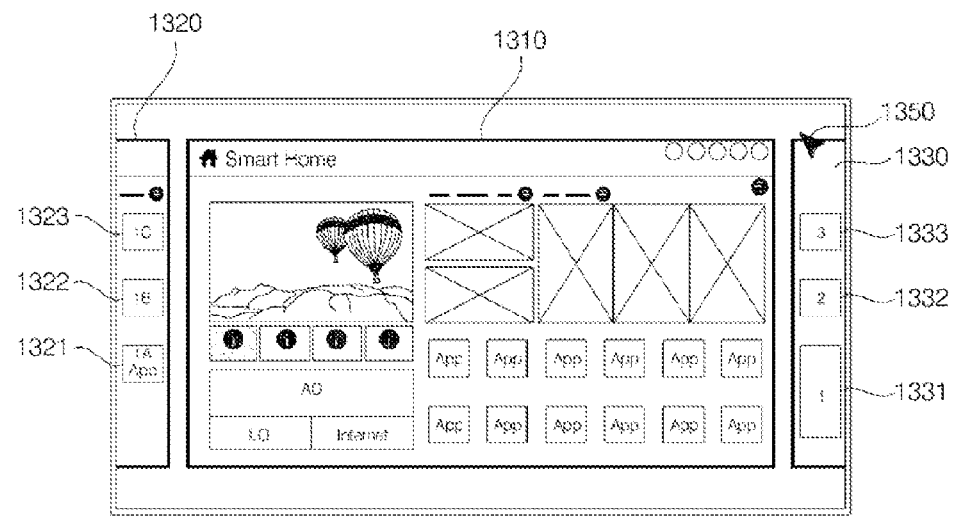

Meanwhile, according to embodiments, the home screen may be a screen to display one dashboard as the entire screen as shown in FIG. 11 or a screen to display a plurality of dashboards as shown in FIG. 13. Alternatively, in a case in which a predetermined input is performed on the home screen as shown in FIG. 11, switching to the screen to display the dashboards as shown in FIG. 13 may be performed.

Meanwhile, the home screen may be displayed when powered on, turned on in a standby mode, or switching to the home screen is input.

Meanwhile, content information disposed on the home screen or the dashboard according to the present invention may be selected and disposed based on the viewing history of the user.

Referring to FIG. 11(a), a home screen 1110 or a dashboard may include various kinds of content information, such as a live broadcast 1111 of a predetermined broadcast channel, objects 1112 indicating input sources, an advertisement and other information area 1113, popular real-time broadcast programs 1115, popular VOD contents 1116, and applications 1117.

When the user performs a function to change configuration of the content information disposed on the home screen or the dashboard though a menu 1118 or a setting screen according to the use history of the user, the content information may be configured and disposed according to the viewing history of the user as shown in FIG. 11(b). Afterward, the screen configuration optimized according to the viewing history of the user may be automatically used.

FIG. 11(b) illustrates a home screen 1120 or a dashboard including a live broadcast 1121 of a predetermined broadcast channel, objects 1122 indicating input sources, an advertisement and other information area 1123, popular real-time broadcast programs 1124, and the next popular broadcast programs 1125.

The image display apparatus may index percentage of a live TV viewing time, a VOD viewing time, and an application use time while managing information regarding the use details of the user to determine a use pattern of the user. Afterward, the image display apparatus may provide the user with a home screen or a dashboard screen including recommended content information optimized to the use pattern of the user.

In addition, the image display apparatus may provide content information optimized per day or time zone corresponding to the current time at which the user uses the image display apparatus.

For example, in a case in which a specific user uses the image display apparatus based on a pattern in which the user mainly watches dramas after work on weekdays and watches unwatched TV programs and mainly watches movie VOD on the weekends, data may be collected for a predetermined period based on day, month, and year and, according to the user pattern of the user, a dashboard based on a channel browser may be provided on weekdays and a dashboard based on VOD may be provided on the weekends.

That is, a home screen or a dashboard screen immediately displayed when the user turns the image display apparatus on or displayed according to a user call is configured to be suitable for the user pattern of the user. Consequently, it is possible for the user to directly find and view content without searching for the content.

Meanwhile, the configurations of the content information on the screens shown in FIG. 11 are illustrative. However, the present invention is not limited thereto. The screen may be configured without limitation according to the use history of the user or the user pattern of the user.

For example, FIG. 12(a) illustrates a home screen or a dashboard screen including about 30% of content information related to a live broadcast channel, 0% of content information related to VOD, and about 60% of content information related to applications, FIG. 12(b) illustrates a home screen or a dashboard screen including 0% of content information related to a live broadcast channel, 0% of content information related to VOD, and about 90% of content information related to applications, FIG. 12(c) illustrates a home screen or a dashboard screen including about 30% of content information related to a live broadcast channel, about 60% of content information related to VOD, and 0% of content information related to applications, and FIG. 12(d) illustrates a home screen or a dashboard screen including about 60% of content information related to a live broadcast channel, about 30% of content information related to VOD, and 0% of content information related to applications.

Figure 12:
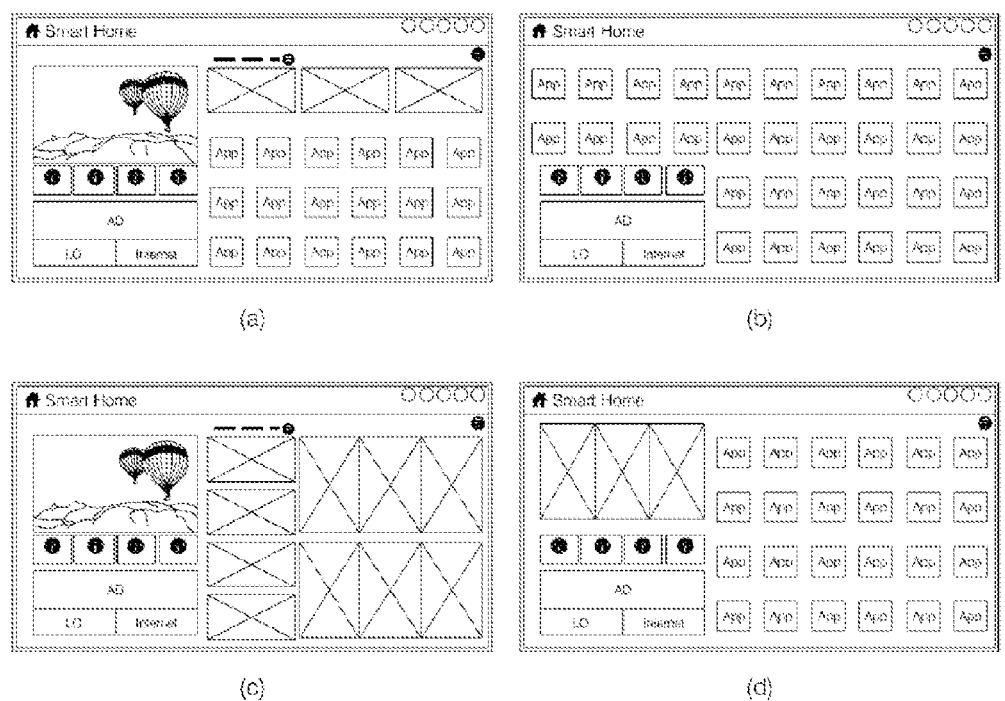

Meanwhile, FIGS. 11 and 12 show embodiments in which the objects 1112 and 1122 indicating the input sources and the objects 1113 and 1123 indicating advertisement and other information are not changed. However, the present invention is not limited thereto. For example, specific content information set according to user setting or manufacture setting may be set not to be changed or content information items which are not changed may be omitted according to the use history of the user.

Referring to FIG. 13, a first dashboard 1310 including a live broadcast video and content information based on the viewing history of the user may be displayed on the display unit 180 (S1010) and a portion of a second dashboard 1320 and a third dashboard 1330 including the content information based on the viewing history of the user may be displayed at the left and the right sides of the first dashboard 1310 or at the upper and lower sides of the first dashboard 1310 (S1020).

As shown in FIG. 13, a dashboard screen on which a plurality of dashboards is displayed may be a screen switched from the home screen of FIG. 11 according to a predetermined input. Alternatively, the dashboard screen may be set as the home screen.

Among entire content information included in the second dashboard 1320 and the third dashboard 1330, content information used by the user with high frequency of use and high time of use may be displayed on the portion of the second dashboard 1320 and the third dashboard 1330.

The content information used by the user with high frequency of use may be high-ranking one of the entire content information or high-ranking content information per category. In addition, the user may set the number of pieces of the content information and types and modes of the content information displayed on the partially displayed dashboards.

For example, content information items 1321, 1322, and 1323 used by the user with high frequency of use and high time of use per category may be displayed on the second dashboard 1320 partially displayed at the left side of the first dashboard 1310.

In addition, a predetermined number of content information items 1331, 1332, and 1333 of the entire content information used by the user with high frequency of use and high time of use may be displayed on the third dashboard 1330 partially displayed at the right side of the first dashboard 1310.

Furthermore, the size and position of the content information items may be decided based on the user's use time and the number of times of use.

Meanwhile, the arrangement order of the first-ranking, second-ranking, and third-ranking content information items 1331, 1332, and 1333 may be changed.

In addition, the color, size, and position of the content information items may be decided according to the order of priority of the content information items. An indicator indicating the order of priority of the content information items may be further provided.

Meanwhile, the objects 1321, 1322, 1323, 1331, 1332, and 1333 indicating the content information used by the user with high frequency of use may be entirely displayed. That is, since the current screen displays the first dashboard 1310 as a main dashboard, the second dashboard 1320 and the third dashboard 1330 are partially displayed. However, the content information displayed on the second dashboard 1320 and the third dashboard 1330 may be entirely displayed such that the user can check entire images or text.

Meanwhile, same or different content information items may be included in the first to third dashboards.

Meanwhile, update information related to the second dashboard 1320 and the third dashboard 1330 may be further displayed on the second dashboard 1320 and the third dashboard 1330, which are partially displayed.

Subsequently, the control unit 170 may receive an input to select the second dashboard 1320 or the third dashboard 1330 (S1030) and control one selected from between the second dashboard 1320 and the third dashboard 1330 to be entirely displayed on the area on which the first dashboard 1310 was displayed based on the selection input (S1040).

That is, the control unit 170 may perform screen switching such that the selected dashboard is entirely displayed on the middle of the dashboards as a main dashboard.

As a result, the control unit 170 may display a portion of a fourth dashboard on the area on which the selected dashboard was displayed (S1050) and display a portion of the live broadcast video on the area on which the unselected dashboard, i.e. the other selected from between the second dashboard 1320 and the third dashboard 1330, was displayed (S1060).

Figure 14:
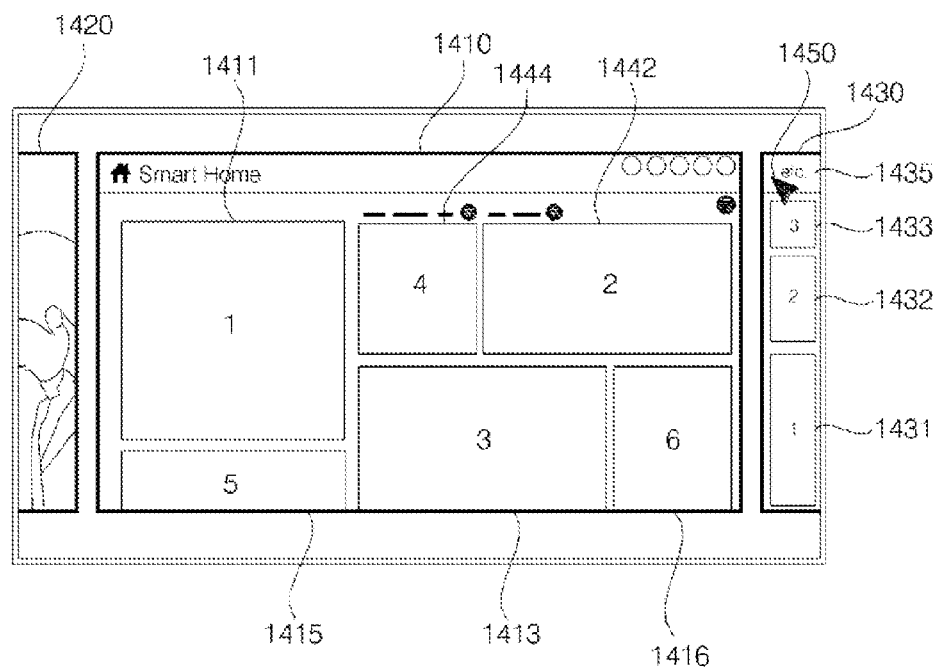

Referring to FIGS. 13 and 14, in a case in which the user selects the third dashboard 1330 by using a pointer 1350 controlled based on motion of the remote controller 200 or inputting a signal having directivity, an entire third dashboard 1410 including all content information items 1411, 1412, 1413, 1414, 1415, and 1416 of the selected third dashboard 1330 may be displayed on the area on which the main dashboard is displayed, i.e. the first dashboard 1310 was displayed.

In addition, a new fourth dashboard 1430 may be partially displayed at the right side of the entire third dashboard 1410. The fourth dashboard 1430, which is partially displayed, may include content information items 1431, 1432, and 1434 based on the use history of the user.

Furthermore, the first dashboard 1310 may move to the left side of the entire third dashboard 1410 such that only a portion of the first dashboard 1310 is displayed. In this case, a portion of the live broadcast video may be displayed on a first dashboard 1420, only a portion of which is displayed.

The user may perform screen switching after advertisement ends or an uninteresting portion passes while viewing an image of the first dashboard 1420, only a portion of which is displayed.

Meanwhile, in this embodiment, the first dashboard 1420 includes a live broadcast video. However, the live broadcast video may be replaced with a main image being reproduced, such as a VOD and a stored motion picture.

Referring to the drawings, a portion of the previous dashboard and the next dashboard is displayed on the main dashboard based on content information having high possibility of use according to the use pattern of the user.

Consequently, the user may intuitively check content which has been used most frequently as well as the presence of the previous dashboard and the next dashboard. In addition, movement to another dashboard or content item may be achieved through a flicking input.

Since display formats of the previous dashboard and the next dashboard based on the selected main dashboard are different from each other, it is possible for the user to intuitively check a dashboard searching direction.

Meanwhile, update information related to the fourth dashboard 1430 and the first dashboard 1330 may be further displayed on the fourth dashboard 1430 and the first dashboard 1330, which are partially displayed.

Meanwhile, all of the content information items 1411, 1412, 1413, 1414, 1415, and 1416 are displayed based on the number of pieces of set content information to be displayed. A number of content information items different from the illustrated six content information items may be displayed as the entire content information. For example, in a case in which the user sets the third dashboard 1410 or the entire dashboard to include a maximum of nine content information items, the total number of the content information items may be 9.

Meanwhile, the selection input may be an input to press a predetermined key of the remote controller in a state in which the pointer displayed based on motion of the remote controller is located on any one dashboard, an input to flick in a predetermined direction using the remote controller, or an input to manipulate the direction key of the remote controller.

For example, in FIG. 13, the pointer 1350 may be moved onto the third dashboard 1330 and then a predetermined selection key, such as the OK key, of the remote controller 200 may be pressed to select the third dashboard 1330.

Alternatively, it is possible to provide user experience as if the first, second, and third dashboards 1310, 1320, and 1330 are moved to the left in response to a flicking operation to move the remote controller 200 to the left.

As a result, the first dashboard 1310 may be displayed at the left side of the screen as a portion 1420, the third dashboard 1330, a portion of which was displayed, may be displayed at the middle of the screen as the entirety 1410, and a new fourth dashboard 1430 may be partially displayed at the right side of the third dashboard 1410. In addition, the second dashboard 1320, which was displayed at the leftmost side in FIG. 13, disappears from the screen.

Alternatively, the selection unit may be an input to manipulate the direction key of the remote controller 200 in a manner similar to the flicking input.

Meanwhile, the control unit 170 may control the content information items of the selected dashboard to be arranged and displayed according to the order of priority. In addition, the control unit 170 may control the size and position of the content information items of the selected dashboard to be changed and displayed according to the order of priority.

As can be seen from the change of the screen in FIGS. 13 and 14, the size and position of the third dashboard 1330, a portion of which is displayed, are different from those of the third dashboard 1410, the entirety of which is displayed. In addition, the content information items 1411, 1412, and 1413, which are acquired by changing the position of the high-ranking content information items, i.e. the first-ranking, the second-ranking, and the third-ranking content information items 1331, 1332, and 1333, and enlarging the high-ranking content information items, and the content information items 1414, 1415, and 1416 having lower ranking than the first-ranking, the second-ranking, and the third-ranking content information items 1411, 1412, and 1413 may be further displayed.

Meanwhile, the control unit 170 may control an audio corresponding to the highest-ranking one of the selected content information items to be output.

Referring back to FIG. 14, the control unit 170 may control only an audio of the first content information item 1411 to be output. In addition, in a case in which the first content information item 1411 is an image or text content having no audio signal, the control unit 170 may control an audio corresponding to the highest-ranking one of the content information items having an audio signal to be output.

Meanwhile, at the step of partially displaying the second dashboard 1320 and the third dashboard 1330 (S1020), a menu object to enable the other undisplayed content information of the second dashboard 1320 and the third dashboard 1330 to be viewed may be further displayed.

For example, as shown in FIG. 14, a menu object 1434 to enable the other content information of the fourth dashboard 1430 to be viewed may be further provided.

Figure 15:
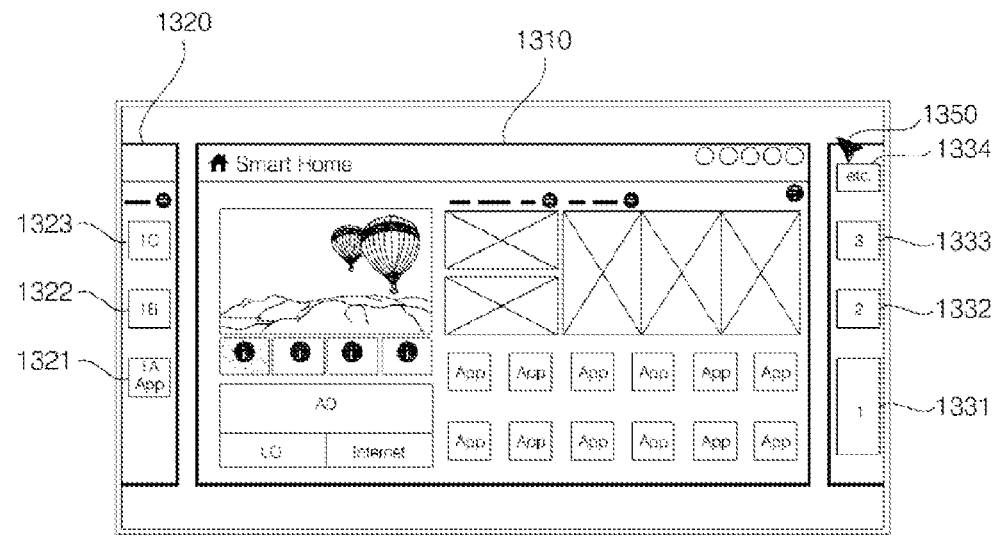

FIG. 15 shows an embodiment in which the third dashboard 1330 of FIG. 13 further includes a menu object 1334 to check other content information items in addition to the first-ranking, the second-ranking, and the third-ranking content information items 1331, 1332, and 1333. When the user selects the menu object 1334, the control unit 170 may further display additional content information of the third dashboard 1330.

Meanwhile, according to embodiments, the control unit 170 may consider an input through the remote controller 200 in a state in which the pointer displayed based on motion of the remote controller 200 is located on a predetermined dashboard as an input to the dashboard on which the pointer is located.

For example, when the user moves the wheel 291 in a state in which the pointer is located on a predetermined dashboard, the content information items in the corresponding dashboard may be scrolled. On the other hand, when the user moves the wheel 291 in a state in which the pointer is located outside a predetermined dashboard, the entire screen may be scrolled.

Figure 16:
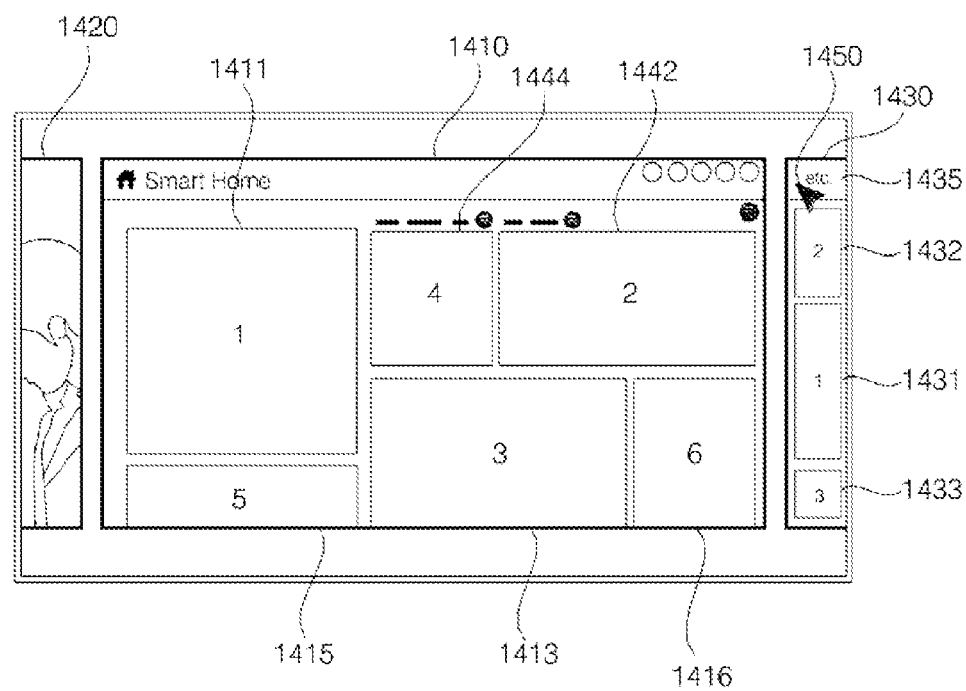
Figure 17:
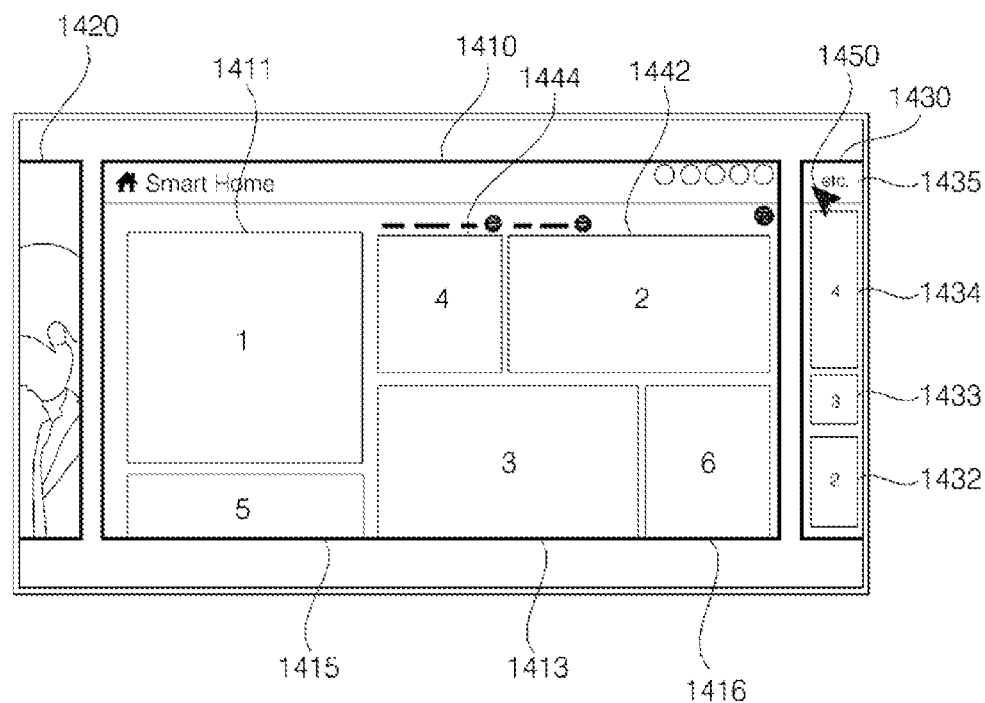

When the user manipulates the wheel or the direction key according to setting in a state in which a pointer 1450 is located on the fourth dashboard 1430 in FIG. 14, the order and position of the content information items 1431, 1432, and 1433 as shown in FIG. 16 may be changed or one 1431 of the content information items 1431, 1432, and 1433 as shown in FIG. 17 may disappear and the next-ranking content information item 1434 may be displayed.

Alternatively, in a case in which the pointer displayed based on motion of the remote controller is located on a predetermined dashboard for a predetermined time or more, the control unit 170 may control the content information items of the predetermined dashboard to be replaced with other content information items which have not been displayed and the replaced content information items to be displayed.

That is, in a case in which the pointer displayed based on motion of the remote controller is located on a predetermined dashboard for a predetermined time or more, the screen of FIG. 14 may be switched to the screen of FIG. 16 or 17 even when there is no specific input.

Meanwhile, upon receiving an input to select any one of the content information items included in the first to fourth dashboards, the control unit 170 may control content corresponding to the selected content information item to be executed. For example, in a case in which a motion picture is selected from among the content information items, the motion picture may be reproduced. In a case in which an application is selected from among the content information items, the application may be executed. In a case in which a broadcast channel is selected from among the content information items, tuning to the selected broadcast channel may be performed.

Meanwhile, according to embodiments, upon receiving a direction key input or a flicking input of the remote controller corresponding to a direction perpendicular to the direction in which the first to third dashboards or the second to fourth boards are arranged, the control unit 170 may control the content information items included in at least one of the first to fourth dashboards to be replaced with other content information items and the replaced content information items to be displayed.

For example, upon receiving an upward and downward direction key input or a flicking input on the screen of FIG. 14 on which dashboards, which are partially displayed, are arranged at the left side and the right side of the main dashboard, the screen of FIG. 14 may be switched to the screen of FIG. 16 or 17.

Meanwhile, a step of displaying priority content information items of a plurality of dashboards at the lower side of the second dashboard, which is entirely displayed, may be further included.

Figure 18:
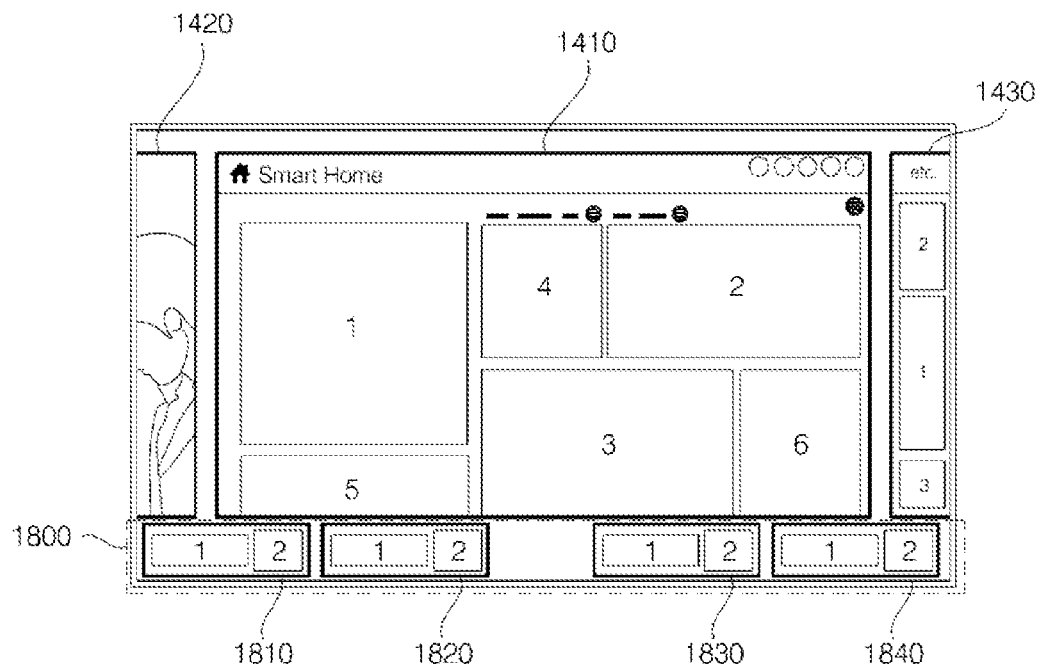

Referring to FIG. 18, priority content information items of a plurality of dashboards 1810, 1820, 1830, and 1840 may be displayed at the lower side of the second dashboard 1410. The user may select one of the priority content information items of the dashboards 1810, 1820, 1830, and 1840 without switching between the dashboards and use content corresponding to selected priority content information items.

In this embodiment, in a case in which the user sets and uses a large number of dashboards, a larger number of content information items based on the user history of the user may be provided on one screen such that time necessary to search for a dashboard is reduced and specific content is rapidly used.

Alternatively, in an embodiment in which sub dashboards 1420 and 1430 are arranged at the upper and lower sides of the second dashboard 1410 unlike FIG. 18, the priority content information items of the dashboards 1810, 1820, 1830, and 1840 may be displayed at the right side or the left side of the second dashboard 1410.

According to embodiments, in a case in which the second dashboard or the third dashboard is selected and switched as a main dashboard, information regarding progress of the task executed at the first dashboard may displayed on the first dashboard which is moved to the side of the selected dashboard and partially displayed.

Figure 19:
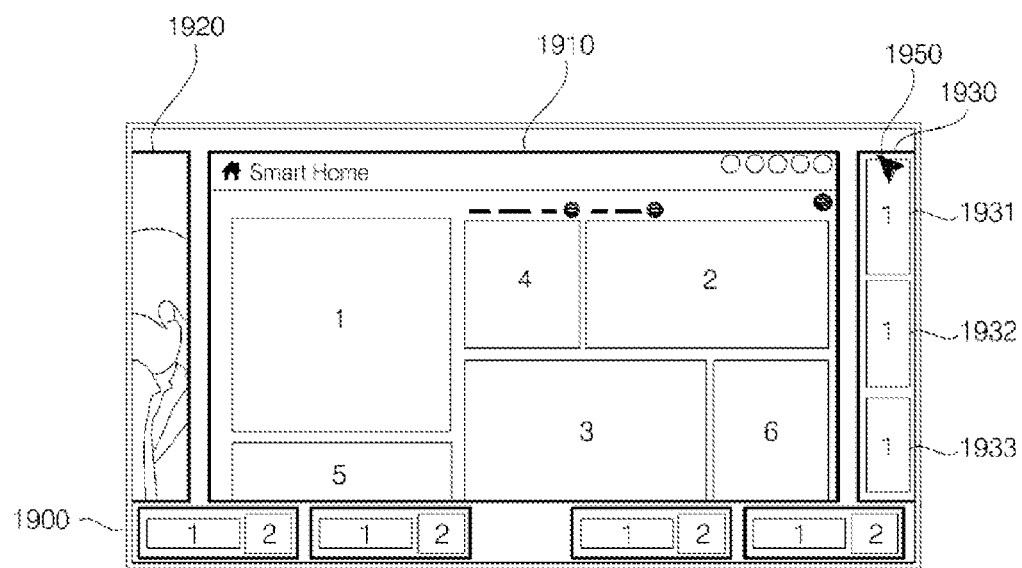
Figure 20:
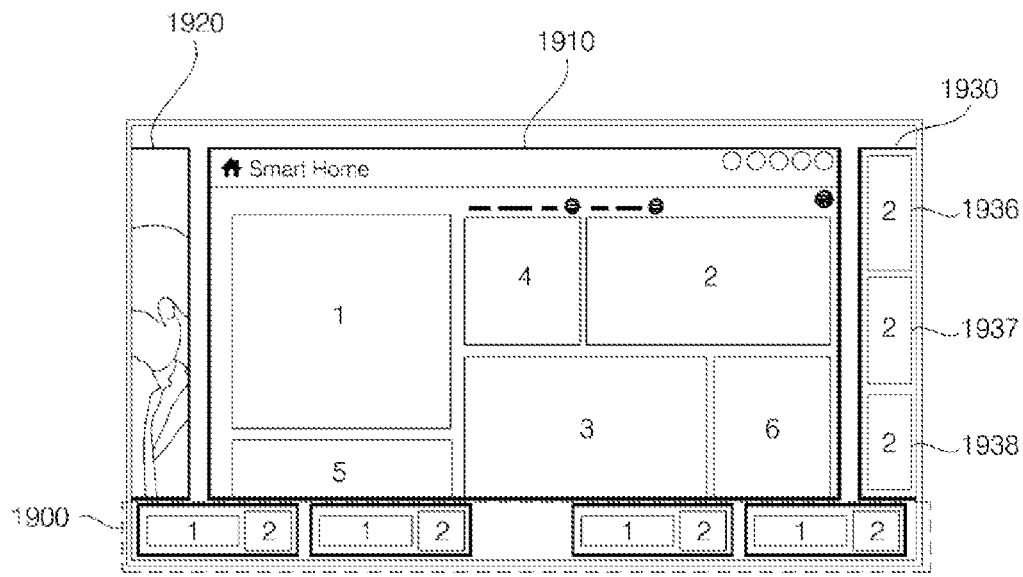

Meanwhile, referring to FIGS. 19 and 20, sub dashboards may be disposed at the right side and the left side of a main dashboard 1910.

Similarly to the embodiments as described above, a portion of the previous dashboard 1920 based on the selected main dashboard 1910 may be displayed at one side of the main dashboard 1910 and a portion of the next dashboard 1930 based on the selected main dashboard 1910 may be displayed at the other side of the main dashboard 1910.

In addition, high-priority content information items 1931, 1932, and 1933 of the content information of the dashboards may be displayed on the sub dashboard 1930, a portion of which is displayed. That is, any one sub dashboard may include first-ranking content information of each dashboard.

Furthermore, in a case in which a pointer 1950 is located on the sub dashboard 1930 for a predetermined time or more, switching to and display of next-priority (second-ranking) content information items 1936, 1937, and 1938 of each dashboard may be performed.

In addition, in a case in which the user selects any one of the content information items 1931, 1932, 1933, 1936, 1937, and 1938, switching to a dashboard including the corresponding content information item may be performed or corresponding content may be directly executed.

Figure 21:
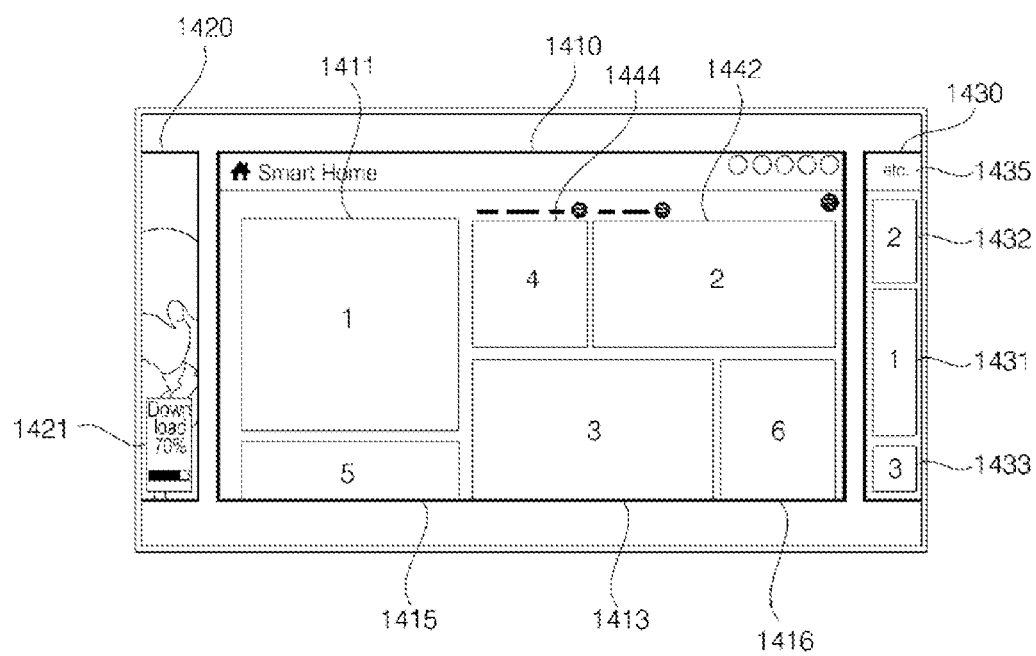

FIG. 21 shows an example of displaying download progress information 1421 during execution of a download task. In addition to the download progress information 1421, information indicating a recording progress degree, an application download degree, and an update degree may be displayed according to the progressed task.

Alternatively, information regarding the progress of the task executed at the first dashboard may be displayed on an area adjacent to the first dashboard.

The image display apparatus according to the present invention and the operation method thereof may not be limitedly applied to the construction and method of the embodiments as previously described; however, all or some of the embodiments may be selectively combined to achieve various modifications.

Meanwhile, the operation method of the image display apparatus according to the present invention may be realized as code, which is readable by a processor included in the display apparatus, in recording media readable by the processor. The recording media readable by the processor includes all kinds of recording devices to store data which are readable by the processor. Examples of the recording media readable by the processor may include a read only memory (ROM), a random access memory (RAM), a compact disc read only memory (CD-ROM), a magnetic tape, a floppy disk, and an optical data storage device. In addition, the recording media readable by the processor may also be realized in the form of a carrier wave, such as transmission through the Internet. Furthermore, the recording media readable by the processor may be distributed to computer systems connected to each other through a network such that a code readable by the processor is stored or executed in a distribution mode.

As is apparent from the above description, according to the embodiment of the present invention, a dashboard to display only a portion of graphics objects displayed on various screens is utilized. Consequently, it is possible for a user to easily and conveniently use desired content.

In addition, it is possible for the user to intuitively check screen configuration and current screen positions.

Furthermore, a variety of user interfaces may be provided in an image display apparatus. Consequently, it is possible to improve user convenience.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An operation method of an image display apparatus, the method comprising:
    displaying a first dashboard comprising a live broadcast video and content information based on viewing history of a user on a display device;
    displaying a portion of a second dashboard and a third dashboard comprising content information based on the viewing history of the user at left and right sides of the first dashboard or at upper and lower sides of the first dashboard;
    receiving, by a user input interface device, an input to select the second dashboard or the third dashboard;
    displaying an entirety of one selected from between the second dashboard and the third dashboard on an area on which the first dashboard was displayed based on the selection input;
    displaying a portion of a fourth dashboard on an area on which the selected dashboard was displayed;
    displaying a portion of the live broadcast video on an area on which an unselected one of the second and third dashboards was displayed; and
    displaying information regarding a progress of a task executed at the first dashboard,
    wherein the displaying the portion of the second dashboard and the third dashboard comprises entirely displaying objects indicating content information used by the user with high frequency of use among content information in the second dashboard and the third dashboard,
    wherein the displaying information regarding a progress of a task executed at the first dashboard further comprises displaying the information on the first dashboard which is moved to the side of the unselected dashboard.

2. The operation method according to claim 1, wherein the selection input comprises an input to press a predetermined key of a remote controller in a state in which a pointer displayed based on motion of the remote controller is located on any one dashboard, an input to flick in a predetermined direction using the remote controller, or an input to manipulate a direction key of the remote controller.

3. The operation method according to claim 1, wherein the step of displaying the portion of the second dashboard and the third dashboard comprises further displaying a menu object to enable the other undisplayed content information of the second dashboard and the third dashboard to be viewed.

4. The operation method according to claim 1, wherein the step of displaying the entirety of one selected from between the second dashboard and the third dashboard comprises arranging and displaying all content information items of the selected dashboard according to order of priority.

5. The operation method according to claim 1, wherein the step of displaying the entirety of one selected from between the second dashboard and the third dashboard comprises changing and displaying size and position of content information items of the selected dashboard according to order of priority.

6. The operation method according to claim 1, further comprising outputting an audio corresponding to highest-priority content information item among content information items of the selected dashboard.

7. The operation method according to claim 1, wherein an input through a remote controller in a state in which a pointer displayed based on motion of the remote controller is located on a predetermined dashboard comprises an input to the dashboard on which the pointer is located.

8. The operation method according to claim 1, further comprising, in a case in which a pointer displayed based on motion of a remote controller is located on a predetermined dashboard for a predetermined time or more, replacing content information items of the predetermined dashboard with other undisplayed content information items and displaying the replaced content information items.

9. The operation method according to claim 1, further comprising:

receiving an input to select any one of content information items in the first to fourth dashboards; and executing content corresponding to the selected content information item.

10. The operation method according to claim 1, further comprising, upon receiving a direction key input or a flicking input of a remote controller corresponding to a direction perpendicular to a direction in which the first to third dashboards are arranged, replacing content information items in at least one of the first to third dashboards with other content information items and displaying the replaced content information items.

11. The operation method according to claim 1, wherein size and position of the content information are decided based on the user's use time and the number of times of use.

12. The operation method according to claim 1, wherein the step of displaying the portion of the second dashboard and the third dashboard comprises further displaying update information related to the second dashboard and the third dashboard.

13. The operation method according to claim 1, wherein the content information is decided based on current time.

14. The operation method according to claim 1, further comprising displaying priority content information items of a plurality of dashboards at a lower side of the second dashboard, which is entirely displayed.

* * * * *